(12) United States Patent
Liu et al.

(10) Patent No.: US 10,593,350 B2
(45) Date of Patent: Mar. 17, 2020

(54) QUANTIFYING CUSTOMER CARE UTILIZING EMOTIONAL ASSESSMENTS

(71) Applicant: International Business Machines Corporation, Armonk, NY (US)

(72) Inventors: Xiaotong Liu, San Jose, CA (US); Anbang Xu, San Jose, CA (US); Zhe Liu, San Jose, CA (US); Vibha S. Sinha, Santa Clara, CA (US); Rama Kalyani T. Akkiraju, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/959,193

(22) Filed: Apr. 21, 2018

(65) Prior Publication Data
US 2019/0325897 A1    Oct. 24, 2019

(51) Int. Cl.
| | |
|---|---|
| H04M 3/51 | (2006.01) |
| G10L 25/63 | (2013.01) |
| G10L 15/26 | (2006.01) |
| H04M 3/42 | (2006.01) |

(52) U.S. Cl.
CPC .......... *G10L 25/63* (2013.01); *G10L 15/265* (2013.01); *H04M 3/42221* (2013.01); *H04M 3/5175* (2013.01); *H04M 2203/401* (2013.01)

(58) Field of Classification Search
CPC ....... H04M 3/42221; H04M 2203/402; H04M 3/5175; G10L 15/265

USPC .................................................. 379/265.07
See application file for complete search history.

(56) References Cited

U.S. PATENT DOCUMENTS

| | | |
|---|---|---|
| 6,542,602 B1 | 4/2003 | Elazar |
| 7,577,246 B2 | 8/2009 | Idan et al. |
| 8,463,606 B2 | 6/2013 | Scott et al. |
| 8,761,376 B2 | 6/2014 | Pande et al. |
| 8,983,975 B2 | 3/2015 | Kenton et al. |
| 9,014,364 B1 | 4/2015 | Koster et al. |

(Continued)

OTHER PUBLICATIONS

Huang et al., Topic detection from Microblogs Using T-LDA and Perplexity, 2017, IEEE (Year: 2017).*

(Continued)

*Primary Examiner* — Ahmad F. Matar
*Assistant Examiner* — Jirapon Intavong
(74) *Attorney, Agent, or Firm* — Levine's Tech Consulting LLC; Frank E. Levine

(57) ABSTRACT

A method, a computer program product, and an information handling system is provided for reducing cost and improving real-time performance for analyzing and representing customer care communication progression based on tone assessments by monitoring communications between a plurality of customers and a plurality of representatives to form a plurality of interaction histories. Analyzing a text form of the plurality of interaction histories according to a Tone Latent Dirichlet Allocation [T-LDA] model to determine a plurality of conversation tones. Mapping the plurality of conversation tones to a plurality of conversation phases and providing a representation of the conversation tones identifying a first customer tone at a first conversation phase and a second customer tone at a second conversation phase.

20 Claims, 12 Drawing Sheets

(56) References Cited

U.S. PATENT DOCUMENTS

| | | | |
|---|---|---|---|
| 9,538,007 | B1 | 1/2017 | Mariappan et al. |
| 2002/0002464 | A1 | 1/2002 | Petrushin |
| 2006/0265090 | A1 | 11/2006 | Conway et al. |
| 2009/0222313 | A1 | 9/2009 | Kannan et al. |
| 2010/0332287 | A1 | 12/2010 | Gates et al. |
| 2012/0054037 | A1 | 3/2012 | Grossman |
| 2013/0282417 | A1 | 10/2013 | Gaedcke et al. |
| 2017/0272571 | A1* | 9/2017 | Spiessbach ....... H04M 3/42221 |

OTHER PUBLICATIONS

Knoahsoft, Inc., "Speech Analytics Software," https://www.knoahsoft.com/applications/analytics/speech-analytics-software [Accessed Jan. 20, 2018].

A. Pangan, "Call Center Agents Can Detect Callers' Mood and Emotion, or Can They Really?" https://www.infinitcontact.com/blog/call-center-agents-can-detect-callers-mood-emotion/ [Accessed Jan. 20, 2018].

R. Choudhary, "'Dear customer, I can feel you'—from emotion detection to MVP." Aug. 11, 2017 https://towardsdatascience.com/dear-customer-i-can-feel-you-from-emotion-detection-to-mvp-9f376a2847bf [Accessed Jan. 20, 2018].

A. Swinscoe, "Don't Design for Emotion in Customer Experience." Jun. 18, 2017 https://www.forbes.com/sites/adrianswinscoe/2017/06/18/dont-design-for-emotion-in-customer-experience/ [Accessed Jan. 20, 2018].

"Grace Period Disclosure", X. Liu, "Understanding Purchase Behaviors through Personality-driven Traces." May 6-11, 2017. In Proceedings of the 2017 CHI Conference Extended Abstracts on Human Factors in Computing Systems (CHI EA '17). ACM, New York, NY, USA, 1837-1843.

V. Fedzkovich. "Analyzing Customer Feedback Emotions with IBM Watson and Bluemix OpenWhisk—Cloud Foundry Live." Aug. 18, 2016 https://www.altoros.com/blog/analyzing-customer-feedback-emotions-with-ibm-watson-and-bluemix-openwhisk/ [Accessed Jan. 20, 2018].

Anonymous, "Emotion analyzing tool for customer requests handling." IP.com Disclosure No. IPCOM000206050D, Publication Date: Apr. 13, 2011.

Herzig, "Predicting Customer Satisfaction in Customer Support Conversations in Social Media Using Affective Features." 2016. In Proceedings of the 2016 Conference on User Modeling Adaptation and Personalization (UMAP 16). ACM, New York, NY, USA, 115-119.

Batt, R., "Managing Customer Services: Human Resource Practices, Turnover, and Sales Growth" Jun. 29, 2000. In Academy of management Journal, 45(3), 587-597.

Chen, L. and Wang, F., "Explaining Recommendations Based on Feature Sentiments in Product Reviews." 2017. In Proceedings of the 22nd International Conference on Intelligent User Interfaces. ACM, 17-28.

Davidov, D, Tsur, O, and Rappoport, A, "Enhanced sentiment learning using twitter hashtags and smileys." 2010. In Proceedings of the 23rd international conference on computational linguistics: posters. Association for Computational Linguistics, 241-249.

Saif, H., He, Y., and Alani, H., "Semantic sentiment analysis of twitter." 2012. In the Semantic Web—ISWC 2012, 508-524.

Mahmud, J., Fei, G., Xu, A., Pal, A., and Zhou, M., "Predicting attitude and actions of twitter users." 2016. In Proceedings of the 21st International Conference on Intelligent User Interfaces. ACM, 2-6.

Jingyi Li, Michelle X Zhou, Huahai Yang, and Gloria Mark, "Confiding in and Listening to Virtual Agents: The Effect of Personality." 2017. In Proceedings of the 22nd International Conference on Intelligent User Interfaces. ACM, 275-286.

Hoque, E., and Carenini, G., "Multiconvis: A visual text analytics system for exploring a collection of online conversations." 2016. In Proceedings of the 21st International Conference on Intelligent User Interfaces. ACM, 96-107.

"Grace Period Disclosure", Yin et al., "Tone Analyzer for Online Customer Service: An Unsupervised Model with Interfered Training." Nov. 6-10, 2017. In Proceedings of the 2017 ACM on Conference on Information and Knowledge Management (CIKM '17). ACM, New York, NY, USA, 1887-1895.

* cited by examiner

| EMOTIONAL TONE | TOPIC WORDS |
|---|---|
| anxious | need help on the substandard phone |
| excited | love sure excited awesome always best |
| frustrated | ridiculous annoying useless worst terrible |
| impolite | sh*t s*cks f*ck f*cking wtf s*ck damn stupid |
| polite | please us know reaching letting assist |
| sad | disappointed bad negative |
| satisfied | thanks ok great cheers sorted helpful resolved |
| sympathetic | sorry hear inconvenience apologies frustration |

| EMOTIONAL TONE | EXAMPLE SENTENCES |
|---|---|
| anxious | My DVD drive stopped reading and burning. |
| excited | Need help on the substandard phone iv. |
| frustrated | This is ridiculous. I've been on hold for two hours. |
| impolite | Stupid f*cking machine cannot take checks. |
| polite | We can help here. Please follow up. |
| sad | Really bad customer service on the phone. |
| satisfied | Thanks for fast service. Problemo resolved. |
| sympathetic | Sorry to hear the item arrived broken. |

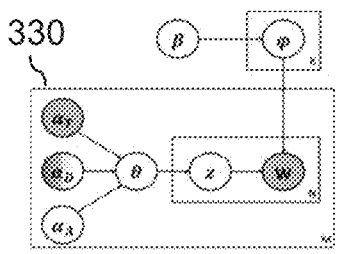

Fig. 3

1540 CONVERSTAIONS WITH CUSTOMER SERVICE AGENTS — 600

| PRODUCT ATTRIBUTES | AGENTS | CUSTOMERS |
|---|---|---|
| 199 | 544 | 14 |
| 59 | 306 | 12 |
| 42 | 268 | 9 |
| 42 | 229 | 6 |
| 42 | 75 | 5 |

610

| | | NUMBER OF STATEMENTS | 2 |
|---|---|---|---|
| CUSTOMER | FRUSTRATED | AFTER AN HOUR AND A HALF OF INSTALLING I'M STARTING TO WONDER... | |
| AGENT | SYMPATHETIC | SORRY ABOUT THE ISSUE. DOES YOUR INSTALLATION LOG FILE... | |
| CUSTOMER | NEUTRAL | YEAH, SAME HAPPENED FOR ........ TRYING TO INSTALL TO A... | |
| AGENT | SYMPATHETIC | I RECOMMEND INSTALLING ON YOUR PRIMARY DRIVE AND FROM... | |
| CUSTOMER | CUSTOMER | I'LL GIVE IT A SHOT, THANKS | |

| Dialog Act | Topic Words |
|---|---|
| Greeting | thank hello reach hey today |
| Technical trouble shooting | mode safe database system restore |
| Concluding conversation | let know need further assistance |
| Offering assistance | look concern help closer take |
| Soliciting information | issue experience problem report detail |
| Referring to specific team | contact team region support assist |
| Providing link | link inform send share follow |
| Responding to billing questions | return card refund cancel charge |
| Emphasizing / acknowledging | feel good want sure right |
| Handling delivers | order arrive delay package estimated |
| Apologizing | sorry frustration inconvenience trouble apologize |
| Requesting identifiers / taking offline | number account name call email |

1020

| Dialog Act | Representative Candidate Sentences |
|---|---|
| Offering help | We'll see what went wrong. |
| Technical trouble shooting | We're working hard to get you on your way to California this morning. |
| Comforting | Have you submitted the Lost Item Report? |
| Soliciting information | You can click here for information regarding identification requirements. |
| Providing information | What's the flight number? |
| Requesting identifiers / taking offline | Sorry to hear you're uncomfortable. |
| Emphathizing | feel good want sure right |

Fig. 10

QUANTIFYING CUSTOMER CARE UTILIZING EMOTIONAL ASSESSMENTS

The following disclosures are submitted under 35 U.S.C. 102(b)(1)(A):

DISCLOSURE: "Tone Analyzer for Online Customer Service: An Unsupervised Model with Interfered Training." by Peifeng Yin, Anbang Xu, Zhe Liu, Taiga Nakamura, in Proceedings of the 2017 ACM on Conference on Information and Knowledge Management (CIKM '17). ACM, New York, N.Y., USA, 1887-1895. Nov. 6-10, 2017.

DISCLOSURE: "Understanding Purchase Behaviors through Personality-driven Traces." By Xiaotong Liu, Anbang Xu, Rama Akkiraju, and Vibha Sinh, in Proceedings of the 2017 CHI Conference Extended Abstracts on Human Factors in Computing Systems (CHI EA '17). ACM, New York, N.Y., USA, 1837-1843, 2017.

BACKGROUND

The present invention relates to a computing environment, and more specifically to a computer program, method, and system for understanding and quantifying customer interactions based on emotional assessments hereafter referred to as "tone" assessments.

SUMMARY

According to one embodiment of the invention, there is provided a method implemented by a processor for reducing cost and improving real-time performance for analyzing and assessing customer care based on tone assessments. The method further comprises monitoring communications between a plurality of customers and a plurality of representatives to form a plurality of interaction histories. Analyzing a text form of the plurality of interaction histories according to a Tone Latent Dirichlet Allocation [T-LDA] model to determine a plurality of customer tones. Mapping the plurality of customer tones to a plurality of conversation phases and providing a representation of the conversation tones identifying a first customer tone at a first conversation phase and a second customer tone at a second conversation phase. Receiving by the T-LDA model a first utterance from the first customer and categorizing the first utterance into a semantic category wherein the semantic category is one of a tone-related category, a domain-specific category, and an auxiliary category Identifying a topic word in the first utterance associated with the semantic category. Associating the topic word with a topic word label and identifying a representative utterance associated with the topic word label.

According to one embodiment of the invention, there is provided a computing program product executing instructions having the steps of the method of assessing customer care based on tone assessments.

According to one embodiment of the invention, there is provided an information handling system including at least one processor executing instructions implementing steps of the method of assessing customer care based on tone assessments.

BRIEF DESCRIPTION OF THE DRAWINGS

The present disclosure can be better understood by referring to the following description when read in conjunction with the accompanying drawings, in which same or similar reference numerals are used to denote same or similar components. The drawings, together with the following detailed description, are included in the specification and foim part thereof, and used to further illustrate by way of example embodiments of the present disclosure and explain principles and advantages of the present disclosure.

FIG. 3 depicts an example set of tones, topic words, and example sentences in an embodiment of the invention herein and a graphic representation of T-LDA.

FIG. 6 depicts examples of reports available with an embodiment of the invention herein.

FIG. 10 depicts examples of mappings between dialog acts and topic words and also mappings between dialog acts and representative candidate sentences.

DETAILED DESCRIPTION

Figure 1:
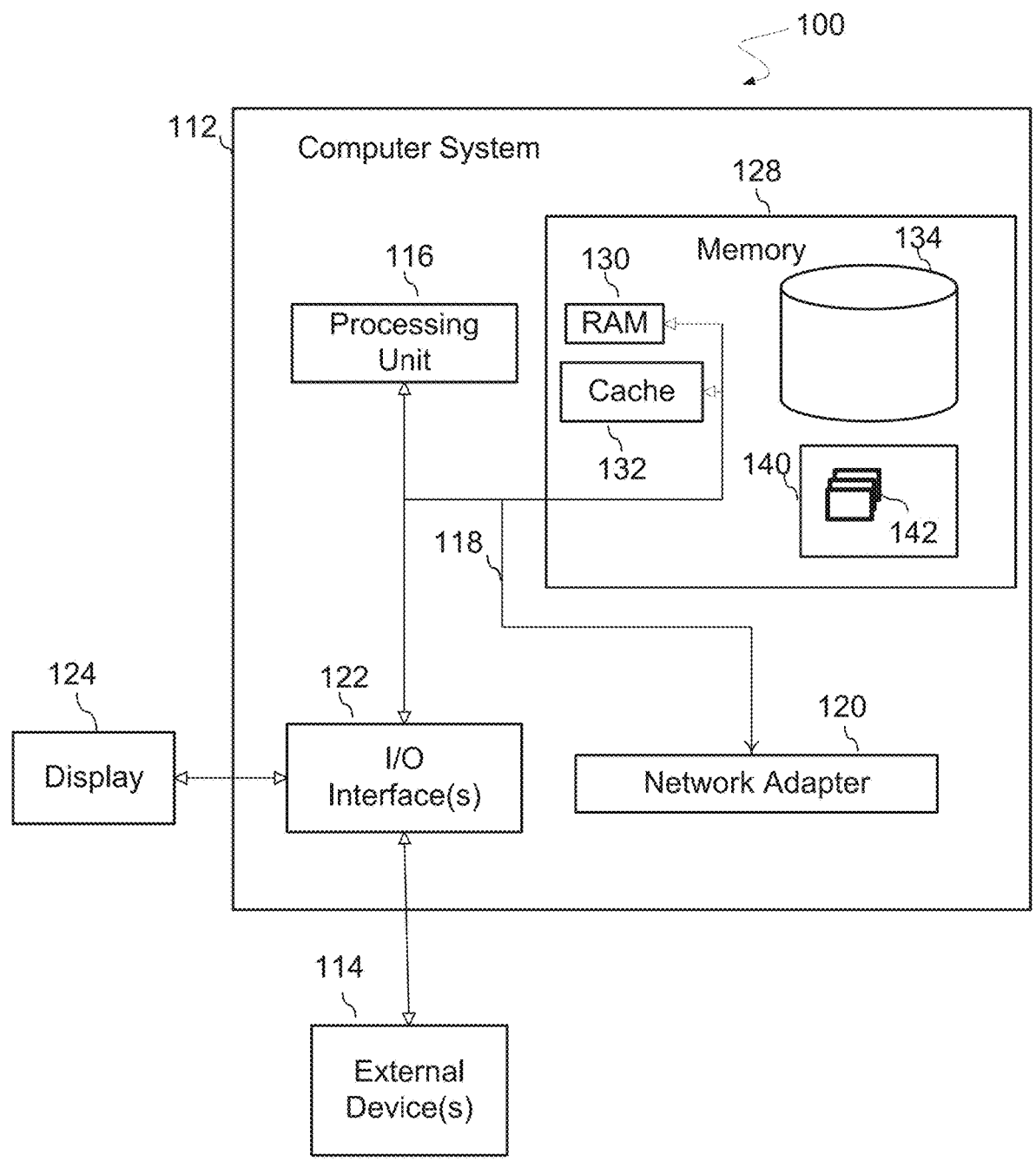
FIG. 1 depicts a computer system 100 according to an embodiment of the present invention and is a block diagram example of a data processing system in which the methods described herein can be implemented.

Embodiments of the invention are described below with reference to drawings in detail. Often, people recognize a need to find information to complete a task, an assignment, or answer a question. Many people have devices that they use to search for the information needed to complete the task. A user of the device will typically use a browser or a search engine to find the information. If the user is not successful, then the user may try getting help to receive the information. While attempting to receive help the user may contact a product support center. The product support center may have a voice response system to assist the user or direct the customer to an actual person. Providing excellent customer care is at the heart of all successful companies and is essential for good user experiences. It can help a company develop a loyal customer base and improve relationships with customers. Customer care can be provided by an actual person, an automated voice response system, or a combination of both.

Customer care mangers are routinely expected to analyze customer care conversations to identify opportunities and trends from online user engagements, improve user experience, drive user satisfaction, and manage agent performance. As many new online platforms such as social media and forums become popular for customer service, it becomes more and more challenging for managers to accomplish their goals effectively and efficiently. Tasks include staying informed of the products and ensuring that customers' questions and problems are resolved properly and quickly. Assessment of the top concerns that customers have with the products is an example of the type of information useful for improving customer care relationships. Monitoring and evaluating agent performance and coaching staff members to improve performance are essential steps in providing customer care. In the case of the customer care being provided by an automated response system, improvement or changes to the automated response system may be identified and approved by a customer care manager. Assessing customer satisfaction with the support may be instrumental in assessing agent performance. Most call center managers rely on quality monitoring questionnaires to assess behavioral and procedural aspects of calls. Many computational systems have been developed to provide analytic insights of conversations or to enhance customer engagement. More recently, researchers have explored social computing methods to predict sentiment, attitude, and personality from users' digital footprints, and extract topics from online conversations. However, these approaches are not effective in measuring user experiences in customer care. In an increasingly demanding environment, customer care managers need new analysis tools to assess customers' emotions, prepare management reports, oversee agent performance while ensuring that service level and quality objectives are achieved effectively. Currently there is no attempt to determine a fine grain tone of the customer based on analysis of utterances and to use the tone in assessing customer satisfaction.

In view of the deficiencies in prior art, various method, system, and computer program product embodiments of the invention are provided herein. In contrast with the previously discussed approaches, the present disclosure identifies a computational approach that enables an effective summary of customers' concerns and satisfaction across various products based on their tones detected from conversations.

Referring to FIG. 1, a schematic of a processing system 100 is shown wherein the methods of this invention may be implemented. The processing system 100 is only one example of a suitable system and is not intended to suggest any limitation as to the scope of use or functionality of embodiments of the invention described herein. Regardless, the system 100 is capable of implementing and/or performing any of the functionality set forth herein. In the system 100 there is a computer system 112, which is operational with numerous other general purpose or special purpose computing system environments or configurations. Examples of well-known computing systems, environments, and/or configurations that may be suitable for use with the computer system 112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 112 may be described in the general context of computer system-executable instructions, such as program modules, being executed by a computer system. Generally, program modules may include routines, programs, objects, components, logic, data structures, and so on that perform particular tasks or implement particular abstract data types. The computer system 112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 112 in the system environment 100 is shown in the form of a general-purpose computing device. The components of the computer system 112 may include, but are not limited to, a set of one or more processors or processing units 116, a system memory 128, and a bus 118 that couples various system components including the system memory 128 to the processor 116.

The bus 118 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 112 typically includes a variety of computer system readable media. Such media may be any available media that is accessible by the computer system 112, and it includes both volatile and non-volatile media, removable and non-removable media.

The system memory 128 can include computer system readable media in the form of volatile memory, such as random access memory (RAM) 130 and/or a cache memory 132. The computer system 112 may further include other removable/non-removable, volatile/non-volatile computer system storage media. By way of example only, a storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 118 by one or more data media interfaces. As will be further depicted and described below, the system memory 128 may include at least one program product having a set (e.g., at least one) of program modules 142 that are configured to carry out the functions of embodiments of the invention.

A program/utility 140, having the set (at least one) of program modules 142, may be stored in the system memory 128 by way of example, and not limitation, as well as an operating system, one or more application programs, other program modules, and program data. Each of the operating systems may have one or more application programs, other program modules, and program data or some combination thereof, and may include an implementation of a networking environment. The program modules 142 generally carry out the functions and/or methodologies of embodiments of the invention as described herein.

The computer system 112 may also communicate with a set of one or more external devices 114 such as a keyboard, a pointing device, a display 124, a tablet, a digital pen, etc. wherein these one or more devices enable a user to interact with the computer system 112; and/or any devices (e.g., network card, modem, etc.) that enable the computer system 112 to communicate with one or more other computing devices. Such communication can occur via Input/Output (I/O) interfaces 122. These include wireless devices and other devices that may be connected to the computer system 112, such as, a USB port, which may be used by a tablet device (not shown). Still yet, the computer system 112 can communicate with one or more networks such as a local area network (LAN), a general wide area network (WAN), and/or a public network (e.g., the Internet) via a network adapter 120. As depicted, a network adapter 120 communicates with the other components of the computer system 112 via the bus 118. It should be understood that although not shown, other hardware and/or software components could be used in conjunction with the computer system 112. Examples include, but are not limited to: microcode, device drivers, redundant processing units, external disk drive arrays, RAID systems, tape drives, and data archival storage systems, etc.

Figure 2:
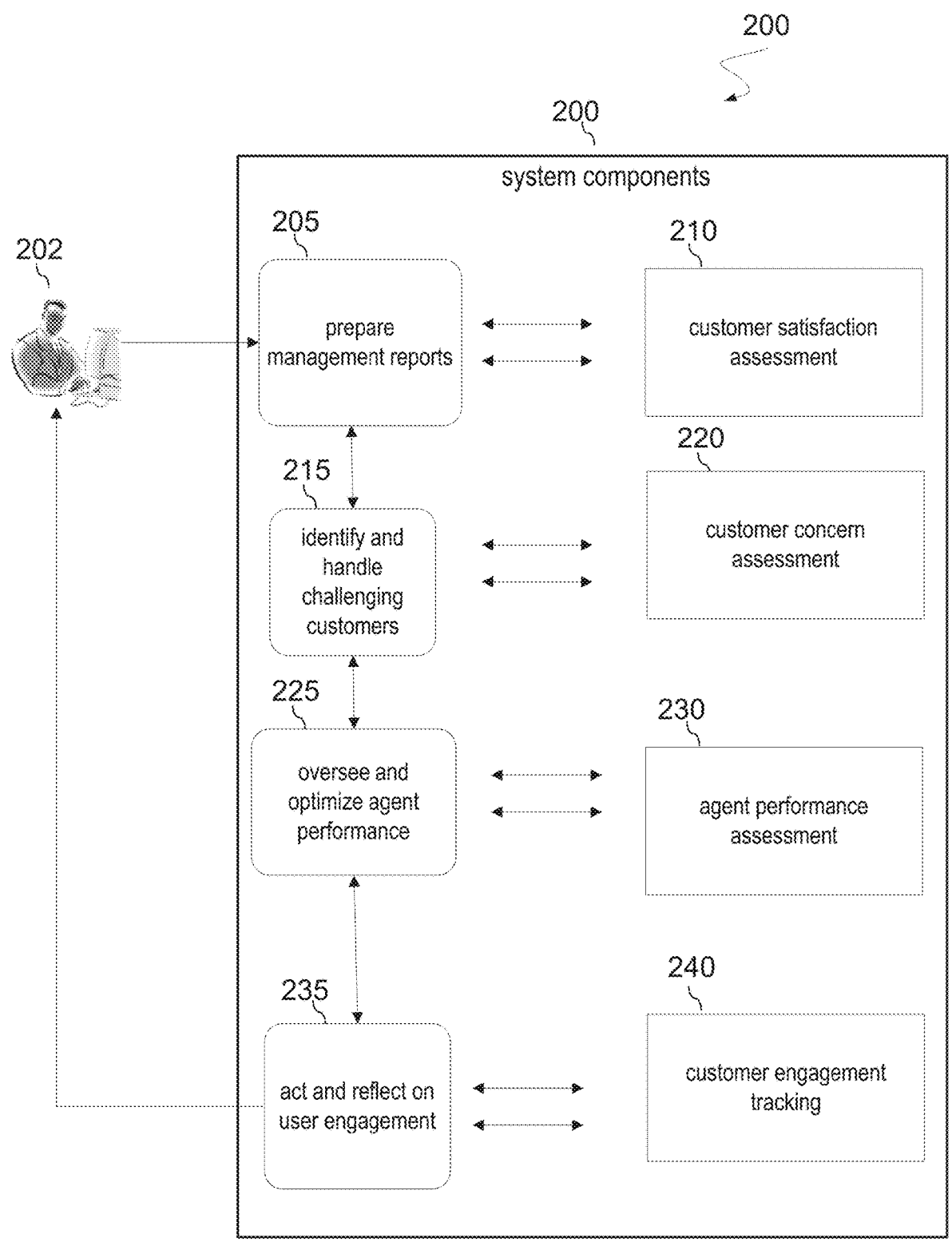
FIG. 2 depicts a functional set of components that may be used to quantifying customer interactions based on tone assessments.

FIG. 2 depicts a functional set of components for achieving an embodiment of aspects of the invention, more specifically, a computational system for tracking and reporting user engagement in customer care is described. The target audience for embodiments of the invention may be call center managers or supervisors. The system is designed to help managers manage and coach agents, identify and handle challenging customers, prepare management reports, and ensure that service level and quality objectives are achieved. The system provides timely visual feedback for managers to make effective decisions in their daily practice. The components are identified for illustration purposes only. The components could be combined and/or separated in different embodiments and packaged for example, but not limited to, as one or more libraries or modules.

Figure 5:
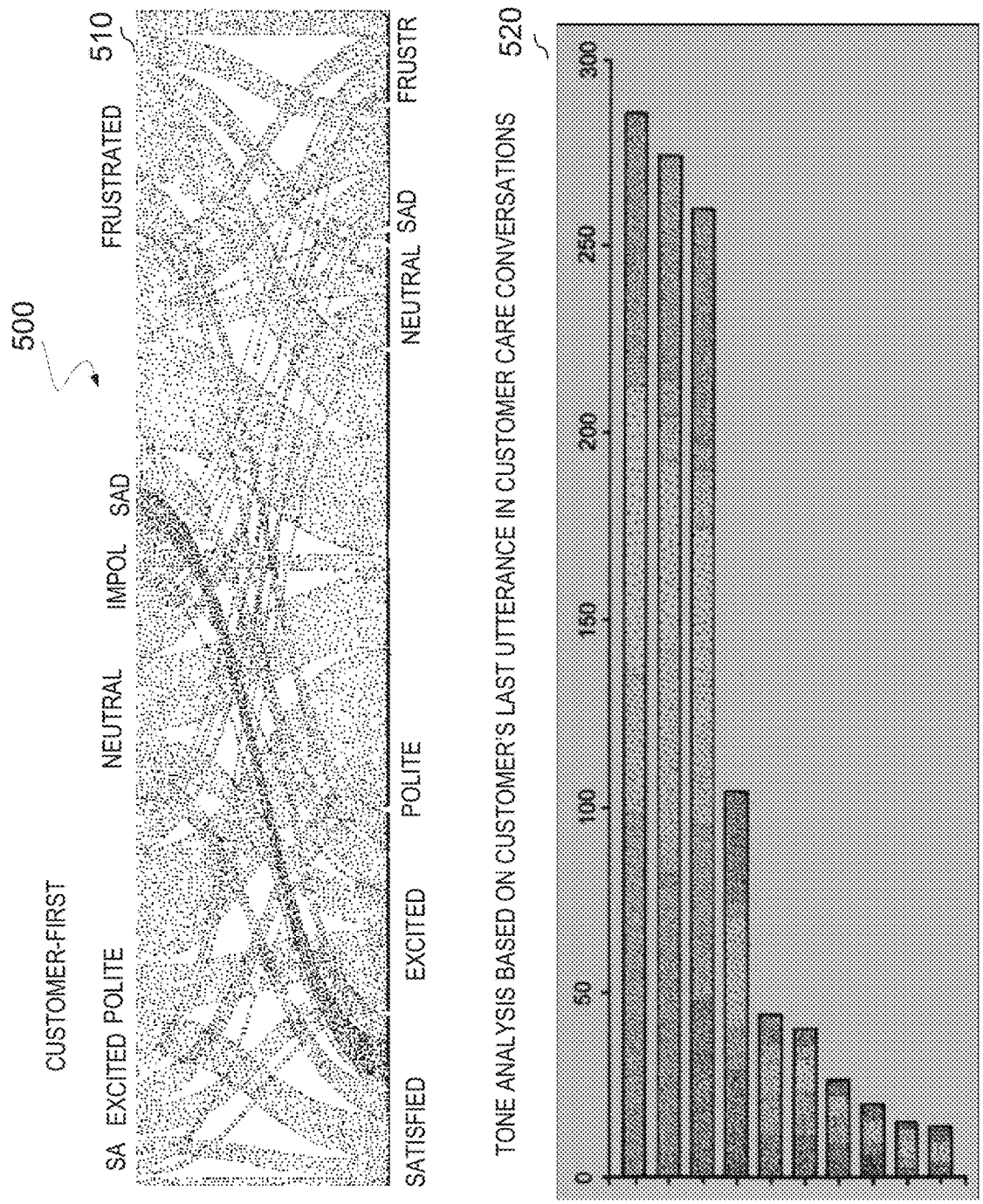
FIG. 5 depicts examples of reports available with an embodiment of the invention herein.

A user 202 utilizes a user interface 705 to interact with the system components 200. The user interface 705 may access a repository 750. In an exemplary embodiment, the interaction provides for support as depicted in FIG. 5 and FIG. 6. Typically, the user 202 is a manager or a supervisor over customer support agents supporting a plurality of products. The system components 200 provide managers with an effective summary of customers' concerns and satisfaction across various products based on the tones detected. The system may utilize an entity extraction method that automatically identifies product entities frequently mentioned in monitored conversations. The entity extraction method may associate customer engagement with products and help managers understand the subject and context of the conversations being analyzed.

Customer satisfaction assessment 210, utilizes tone metrics to assess customer satisfaction. The customer satisfaction assessment 210 estimates fine-grained customer satisfaction rates during customer care conversations. The information gathered by the customer satisfaction assessment 210 may be organized in a form suitable for managers. The information is used to prepare management reports 205 based on requests made by the user 202, typically a manager or a supervisor.

Customer concern assessment 220 identifies customer concerns. The customer concern assessment 220 automatically identifies top products from customer care conversations and associate them with customers' concerns. The information from the customer concern assessment 220 may be organized in a form suitable for viewing by managers and assist the manager to identify and handle challenging customers 215. When the system identifies a current conversation identifying a problem with a customer, a manager may be notified of the problem so that the manager may monitor the current conversation and perform actions to facilitate a better outcome with the customer. The actions may involve, but are not limited to providing assistance to an agent, communicating with the customer, and even directly contacting the customer.

Agent performance assessment 230 utilizes the tone metrics to evaluate agent performance based on customers' tones typically towards the end of a customer care conversation. The information from the agent performance assessment 230 may be used by oversee and optimize agent performance 225 via report interfaces depicted in FIG. 5 and FIG. 6.

Customer engagement tracking 240 is a visual analytics mechanism to help managers track and compare customer engagement at different stages of a conversation. The information from the customer engagement tracking 240 may be used by act and reflect on user engagement 235 via report interfaces depicted in FIG. 5 and FIG. 6.

Tones are used as metrics to describe the emotional aspects in customer engagement, which can shape customers' attitudes and drive their decisions. The tones, include frustrated, sad, satisfied, excited, polite, impolite, and sympathetic. These specific tones are particularly suitable for the customer engagement scenario, and facilitate capturing the precise emotional states of customers and agents. These specific tones are more fine-grained than a sentiment characterization. In a preferred embodiment, the tone analysis is intentionally performed at the utterance (or statement) level rather than for a whole conversation. This is because a customer's tones can change dynamically as they talk to a customer service agent in a conversation. In the customer satisfaction assessment 210 and the agent performance assessment 230, customers' tones are used to determine whether the customer is satisfied or still frustrated towards the end of a conversation. Customer satisfaction at the end of a conversation also indicates how agents perform based on their customers' satisfaction rates. One embodiment is to use the tone of the last utterance as the conversation outcome (e.g. satisfaction). Another embodiment is to aggregate the tones from the utterances to summarize the conversation outcome, or even, to consider the sequential order of these tones. The customer concern assessment 220 may use each customer's utterances as they may express their concerns in any stage of a conversation. A summary of customers' or agents' tones may be provided by the customer engagement tracking 240, so that call center managers can compare how conversations start verses how they finish.

FIG. 3 depicts an example set of tones, topic words, and example sentences in an embodiment of the invention herein and a graphic representation of T-LDA. Table 310 depicts a specific set of tones and provides some example topic words that are used to identify each specific tone. Table 320 depicts an example sentence that may depict the corresponding tone in the table. Emotion analysis of online customer service conservations is important for good user experience and customer satisfaction. In a detailed analysis performed by collecting and labeling online conversations pertaining to customer service a set of 53 emotional metrics (including aggressive, sincere, apologetic, relieved, sad, etc.) were analyzed. Based on a statistical analysis of on-line conversations eight metrics named "tones" were identified as important for customer emotional assessment. These tones are used in an embodiment of the present disclosure to describe emotional information. To better interpret each tone, the Latent Dirichlet Allocation (LDA) model was extended to a Tone LDA (T-LDA). In T-LDA, each latent topic is explicitly associated with one of three semantic categories: tone-related, domain-specific, and auxiliary. By integrating tone label into learning, T-LDA is able to identify representative tone-related words. T-LDA evaluation shows better performance than other baselines in predicting tone intensity. A graphic representation of a case study of T-LDA is shown in 330. Observations are in white and latent variables are in grey. Partially observed variables are half white and half grey.

Figure 4:
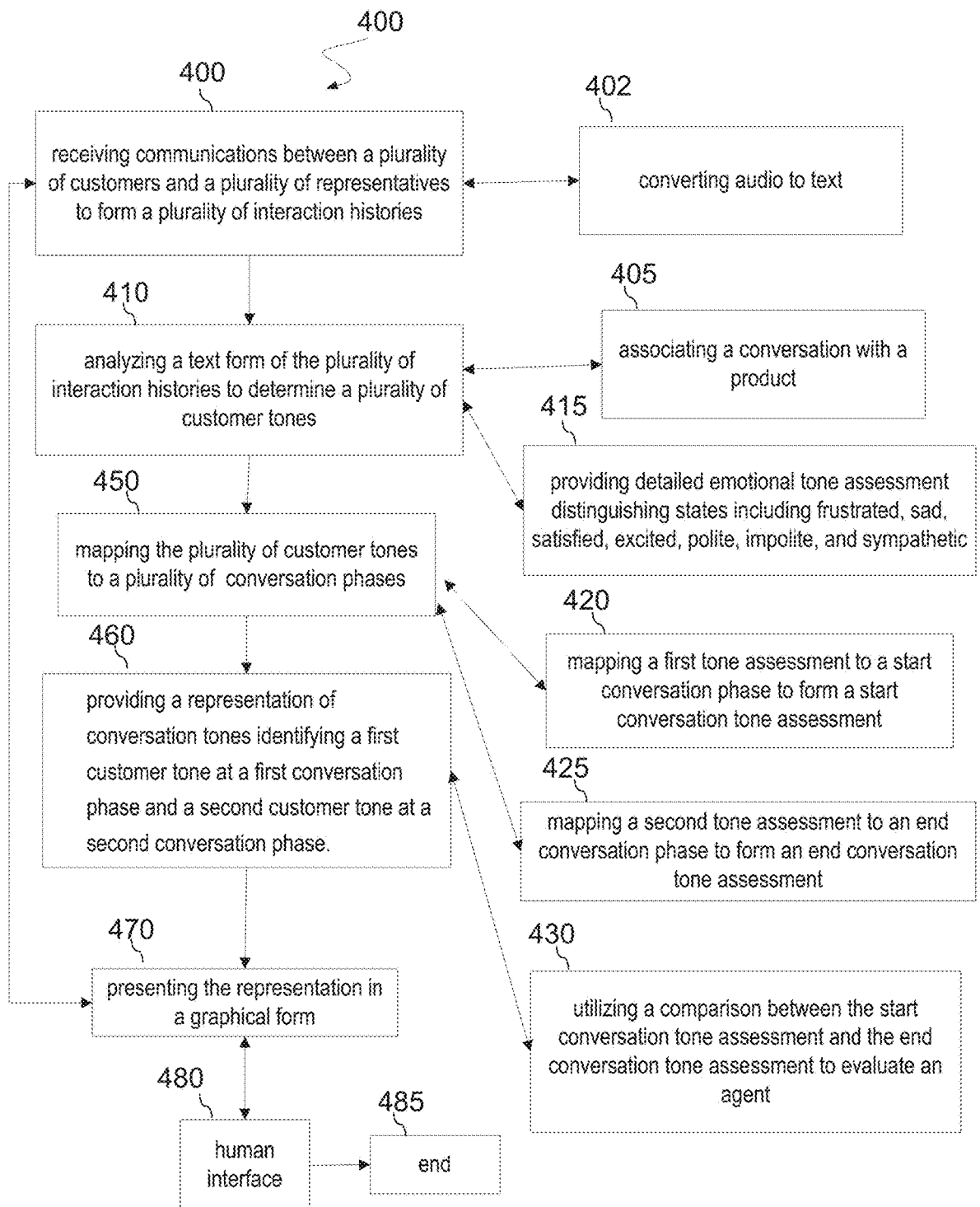
FIG. 4 depicts high level flow for an embodiment of the invention herein.
Figure 12:
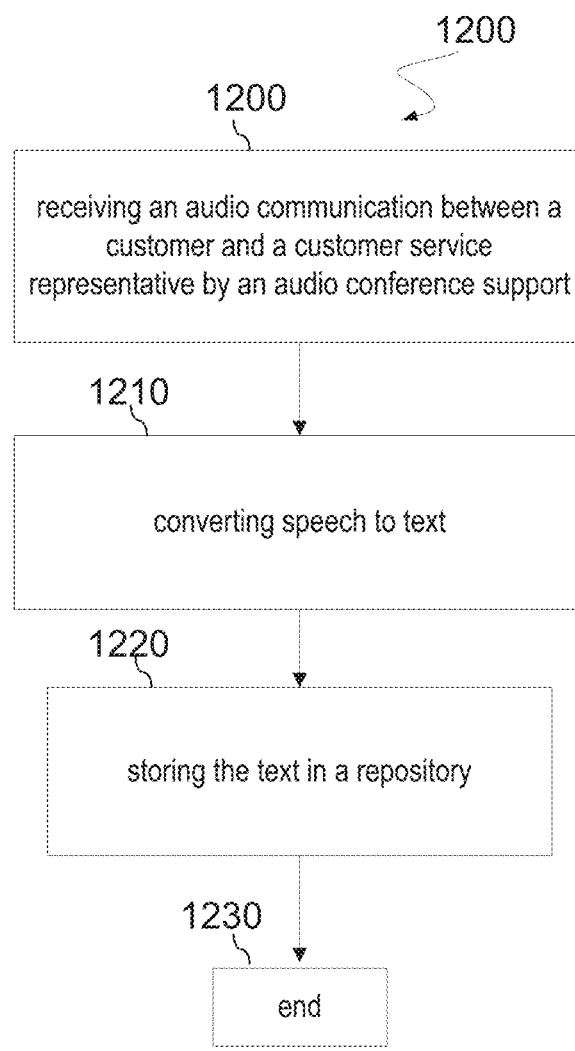
FIG. 12 depicts an example embodiment where a customer communication is via a phone call to a customer support representative.

FIG. 4 depicts a flow of an embodiment of the invention disclosed herein. The process starts by monitoring communications between a plurality of customers and a plurality of representatives to form a plurality of interaction histories 400. The process may be running on a dynamically allocated infrastructure such as a cloud environment to acquire resources as needed to match the conversation demand. Alternatively, the process may be running on a computing system as shown in FIG. 1. Different customers may be using different methods to communicate with customer support. Some could be using a chat or text format and others be communicating via an audio interface such as a phone call. In the case of a phone call communication, the phone call may be connected to an audio conferencing support such as depicted in FIG. 12. In the phone call example, the process proceeds to converting the audio to text 402.

The process continues by analyzing a text form of the plurality of interaction histories to determine a plurality of customer tones 410. During the analysis various natural language processing steps take place, such as, entity extraction, utterance analysis and determination of intents. An entity identifying a product may be extracted from a customer or an agent in which case the process proceeds to associating a conversation with a product 405. Information associated with the conversation may be added to a repository 750. Utilizing T-LDA, the system refines the tone providing detailed emotional tone assessment distinguishing states including frustrated, sad, satisfied, excited, polite, impolite, and sympathetic 415. The process continues by mapping the plurality of customer tones to a plurality of conversation phases 450.

Utterances in the conversation are generally ordered by time. So the communications can be classified as customer utterances CU (CU1, CU2, ..., CUn) at customer utterance times CT (CT1, CT2, ..., CTn) having an emotional customer tone CET (CET1, CET2, ..., CETn) and agent utterances AU (AU1, AU2, ..., AUm) at agent utterance times AT (AT1, AT2, ..., ATm) having an agent emotional tone AET1, AET2, ..., AETm). Depending on analysis of the conversation, and a length of time for the conversation, tones may be separated into conversation phases. In this case the system may be mapping a first tone assessment to a start conversation phase to form a start conversation tone assessment 420. As the conversation progresses, the system may be mapping a second tone assessment to an end conversation phase to form an end conversation tone assessment 425. By the end of the conversation, the system proceeds by utilizing a comparison between the start conversation tone assessment and the end conversation tone assessment to evaluate an agent 430. In addition, the end conversation tone assessment may be used to assess customer satisfaction. These assessments may be performed real-time for continuously utilizing the plurality of customer tones and the plurality of conversation phases to providing a representation of conversation tones identifying a first customer tone at a first conversation phase and a second customer tone at a second conversation phase.460. The process continues by providing presenting the representation in a graphical form 470. Examples of graphical forms is found in FIG. 5. The process allows for real-time interaction via human interface 480 to allow tailoring of the reports and information.

In an exemplary embodiment, the each customer emotional tone CETi and the each agent emotional tone AETj is determined real-time and is available to assess customer satisfaction and agent performance to form the engagement tracking assessment 460 which is used to provide the representation of the engagement tracking assessment 470. The representation may take various forms. If the system detects an unhappy customer, a notification to a person may be made via the human interface 480. That human may be a manager or supervisor who may provide a real-time intervention by reviewing the representation from step 470. Depending on requests from the user utilizing human interface 480, flow may loop back to monitoring communications in step 400. If the system detects a completed conversation or a disconnect between the user and the human interface 480, the information may be recorded in a database and the process may proceed to end 485.

The system support may include the views depicted in FIG. 5 and FIG. 6.

FIG. 5 depicts examples of reports that can be generated via human interface 480. The reports in FIG. 5 allow customer care managers to explore customer care conversations and gain insights into online user engagement. The system may provide an analysis interface that is linked with the aforementioned computational models deployed in a cloud environment. A visual analytic system (see FIG. 5 and FIG. 6) is designed to show the tones generated by the components in the system. For example, a stacked bar chart 520 presentation technique is adopted to offer an overview of customer satisfaction across top products. The presentation also enables interaction mechanisms such as zooming and filtering, then detail-on-demand. Additionally, multiple textual views are included to display the top agents that provide customer service, the customers with the most number of requests, and the full conversation texts in a structured manner, which helps managers understand how a customer's tones evolves during a conversation. In addition, a flow metaphor 510 is introduced to highlight changes of customers' tones over time during a conversation. Managers can also search any keyword of interest (e.g., a product, a customer's name, an agent's name, or a specific topic) in a search panel (not shown). The system extracts all relevant conversations regarding the searched keyword in real time, and updates the presentations and views with only the relevant conversations. This provides managers with an alternative way to drill down to conversations of interest, after they have an initial understanding of the conversations.

Customer-First or Tone Summary View 510 is a multi-tab bar chart presentation designed to summarize customer's salient tones (i.e., the most dominant tone detected by the tone analysis function) across top products or agents. Although shown shaded, in a preferred embodiment, the tones are colored in a diverging color scheme to highlight negative ones (frustrated, sad, impolite), neutral, and positive ones (polite, excited, satisfied). It supports interaction mechanisms such as zooming and filtering, allowing a user to view details on demand in other views. For example, managers can select a bar segment (representing conversations related to a product with a specific tone) and drill down into a subset of conversations that may be used to update other views concurrently.

Tone Flow View 520 is a flow metaphor introduced to present dynamic changes of tones over conversations turns. A set of horizontal bars represent the distributions of tones at one conversation turn. By default, the first and the last utterance of customers are shown, which may be considered to be the most important by customer care managers. Managers can also select certain turns of interest to track the changes of tones. The flow traces, representing the changes of tones, may be colored by the tones at the first turn to allow visual tracking from the start to the end. Although shown as shaded, managers may also be able to choose color flow traces from the end to the start. Expected functionalities may allow managers to hover over a flow trace of interest to highlight the changes of tones and to display percentages of customer's tone changes, for example a percentage of customers' tones that changed from frustrated in the beginning to satisfied in the end.

FIG. 6 also depicts an example of a report that can be generated via human interface 450. Conversation View 610 provides multiple textual subviews that are included to display the representative product attributes, the top agents that provide customer service, the customers with the most number of requests, and full conversation texts in a structured manner. Managers can select a product attribute, a customer or an agent to refine their selection of conversations, or set a threshold to further filter the conversations by the number of utterances.

A search panel (not shown) allows managers to search for any keyword of interest (e.g., a product, a customer's name, an agent's name, or a specific topic) in a search panel. The system searches based on the user input identified as keywords. All relevant conversations pertaining to the searched keyword are searched real time. The information is extracted and updates made to the presentations and views with only the relevant conversations. This provides managers with an alternative way to drill down to conversations of interest, typically after they have an initial understanding of the conversations via visual exploration. The search panel may be applied to any of the views as shown in FIG. 5 and FIG. 6.

Figure 7:
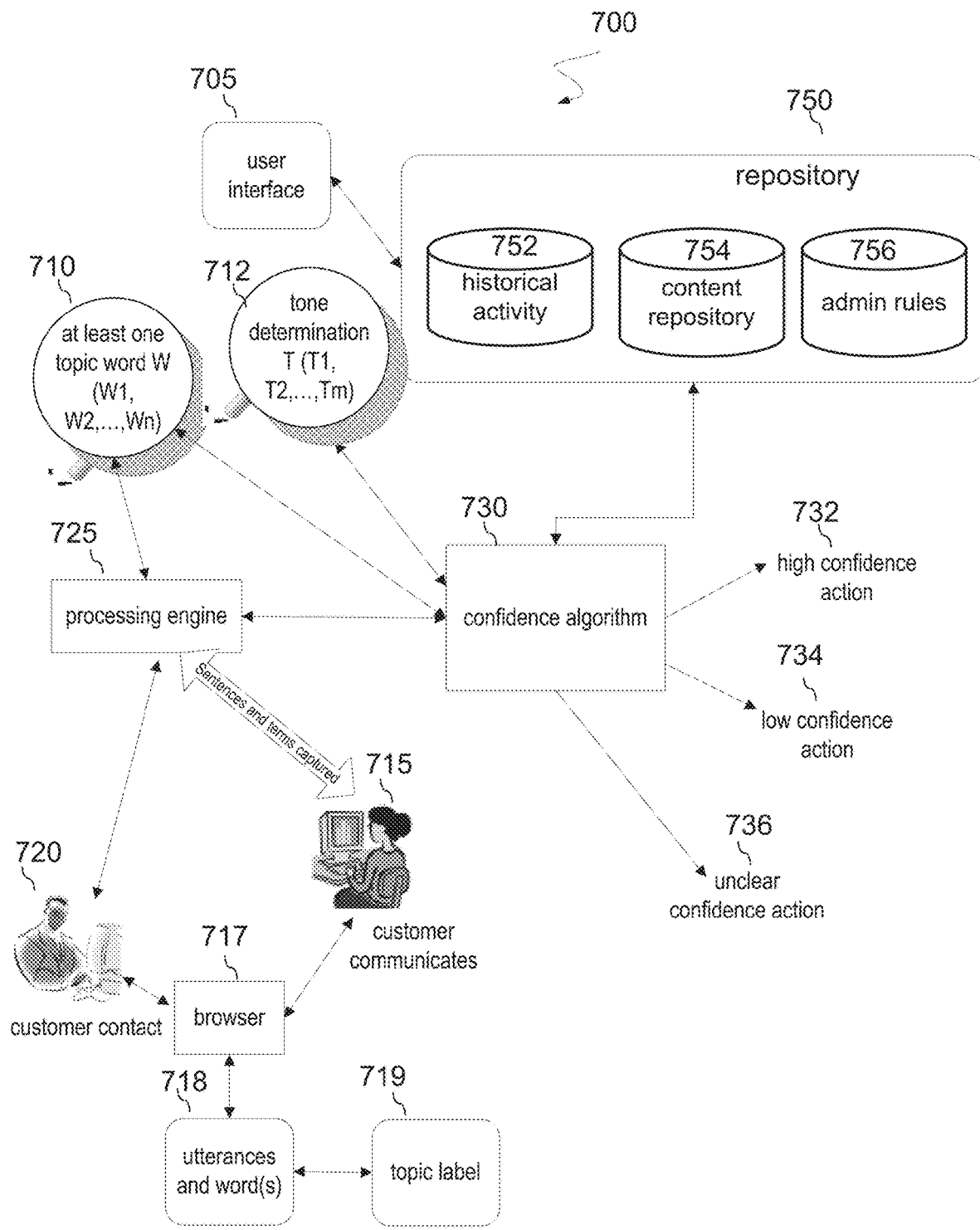
FIG. 7 depicts a functional set of components and a flow of control for aspects of an embodiment of the invention herein.

FIG. 7 depicts an embodiment of the invention herein. Finding out what type of support the customer wants is an example of a usage of the invention described herein. Various technologies are used to automate the process allowing the system to receive and respond to customer queries. The support may be called a dialog application. Portions of the dialog application may be used to form the functions depicted in FIG. 2. The development of a successful dialog application is a time-consuming process and requires a significant amount of manual labor because of the nature of the tasks being performed. One of the tasks performed in the development of a dialog application is the generation of annotations or providing labels for raw speech data. The raw speech data, called "an utterance" can be complete sentences. An utterance may contain a subject conveying a statement, question, exclamation, or command. In addition, an utterance may have a main clause and sometimes one or more subordinate clauses. Currently dialog applications attempt to classify complete utterances. This may be performed by people, performing a "labeling task." Various guides may be developed to assist with the classification task or the "labeling of an utterance."

The system components 200 take advantage of a class of terms or words that identify topics or dialog acts. Those words that identify topics or dialog acts are called "key words" or "topic words." An existing taxonomy is taken as an input and an algorithm is used to ensure generated labels are suitable for a specific purpose, such as, for example, intent detection and conversation modeling, called "utterance labeling." In addition, some embodiments may also provide a representative utterance or sentence based on an utterance label. Embodiments of the invention may have various usages. In an embodiment, annotators label utterances at a topic word level instead of an utterance level and output labels at an individual utterance level. This approach can greatly simplify the labeling task and reduce the labor intensity. In other words, the invention disclosed herein can improve the quality and reduce the cost of utterance labeling. One example usage is for assisting in the process of construction of ground truth mappings for systems utilizing machine learning or artificial intelligence.

An aspect of the invention is described in an example scenario. The user is a customer 715 that bought a product. The product could be any product, for example, but not limited to, a leaf blower, a vacuum, an image editor, a service, such as, cleaning an air duct, and etc. The customer 715 is trying to find out why the product is not working properly or how to get it to perform some type of operation. The customer 715 brings up a search engine using a browser 717. The customer 715 tries different words and word combinations while searching for the answer to the question. The browser 717 returns URLs using its internal search algorithm. The customer 715 may select a customer support web site provided by the product provider, returned by the browser 717. After, a period of time the customer 715 uses browser 717 by accessing the product's web site and an on-line help support [not shown] interface which contacts some type of product support, hereafter called customer contact 720. Other methods for contact might be used, for example, but not limited to, phone, email, short message service (SMS), texting, posting a message, and etc. The customer contact 720 could be an actual person or even a voice response system with an artificial intelligence (AI) capability.

The customer contact 720 communicates with customer 715 and by interactive communication, obtains clarification of why the customer 715 is communicating with customer contact 720. The reason for the contact could be to obtain information, get an error corrected, receive an apology, make an order, make a payment, and etc. In an embodiment, the customer 715 uses one or more sentences to communicate the desired information. Each sentence is referred to as an utterance. Each utterance includes keywords and phrases. The keywords and phrases may be sufficient to obtain a reason for the contact. The process of determining the reason for the communication is called utterance labeling. Once an utterance is labeled, the course of the communication by the customer contact 720 follows a recommended path based on the utterance label. If the labeling is correct, then the communication is likely to follow a path that meets the needs of the customer 715. If the labeling is not correct, then there is a significant chance that the customer will be frustrated.

In order to label the utterances correctly, a history of customer contact is collected. In some embodiments, the history, the sentences, and the keywords are captured in a repository 750. The disposition could be made during the communication. In another embodiment, it could be after the customer verifies the information actually resolves the problem via a customer survey. While the customer 715 communicates with customer contact 720 various information is collected. The information may be as simple as topic words the customer 715 used with the customer contact 720 to describe the problem initially or it could be as complex as retrieving information about the effort the customer 715 used to find the information via searching using browser 717, posting comments on a forum, social media queries, and the like. The information, may be, for example, derived from interactions via instant messages between customer 715 and customer contact 720.

The customer contact 720 contains a processing engine 725 that receives the collected information and identifies at least one topic word 710 that the customer 715 tried to use to find the information. The processing engine 725 utilizes confidence algorithm 730 which interfaces with repository 750. The repository 750 may have various elements. The elements may include, but are not limited to, for example, historical activity 752 that captured other search terms used in the past for similar content stored in content repository 754, and admin rules 756 that are followed when interfacing with repository 750. The confidence algorithm 730 associates at least one topic word 710 from the utterances with the topic label 719 and characterizes the at least one topic word 710 with the topic label 719. In addition, the confidence algorithm 730 makes a tone determination T (T1, T2, . . . , Tm) 712. The confidence algorithm 730 attempts to evaluate if the topic label 719 should be revised to reflect a predicted improvement in labeling and tone determination. Consideration may include historical activity 752 that includes terms customers have used in the past while requiring the specific service or dialog act. The similar content and a characterization of the similar content may be in content repository 754 that may include other features being searched. The confidence algorithm 730 utilizes the at least one topic word 710 and topic label 719 characterization to predict a confidence level of adjusting of the topic label 719 based on changing the at least one topic word 710 associated with the topic label 719. The change may be an addition of one topic word, a change of a second topic word, an addition of a third topic word, a deletion of a fourth topic word, and etc.

The confidence algorithm 730 may apply various admin rules 756 based on different optimization rules. The rules could be by target customer group, a specific product, a product type, an industry product type, or any other tasks, factors, triggers, and the like. Using the admin rules 756, the confidence algorithm 730 may utilize some type of statistical assessment to predict if a change to the topic label 719 should be made. When the confidence algorithm 730 determines that a missing keyword has a high probability of improving topic label 719, the confidence algorithm performs a high confidence action 732, such as, for example, but not limited to, adding additional information to content repository 754 under a predicted improvement to labeling category, updating or changing content in topic label 719, making a recommendation to change the topic label 719, and the like. Those keywords that improve topic label 719 are called topic words and are referenced as at least one topic word 710. However, if the confidence algorithm 730 determines that adding a missing keyword has a low probability of improving topic label 719, the confidence algorithm 730 performs a low confidence action 234, such as, for example, but not limited to, making a determination of not adding a missing topic word to the at least one topic word keyword 710 associated with the topic label 719. Alternatively, the missing keyword may be added to the content repository 754 under a not predicted to improve labeling category, a revise product documentation category, and the like. If the confidence algorithm 730 determines that a missing keyword has an unclear probability of improving topic label 719, the confidence algorithm 730 performs an unclear confidence action 236, such as, for example, but not limited to, recording related information in historical activity 752. The confidence algorithm 730 may have an Artificial Intelligence (AI) component that learns which terms are relevant and utilizes a feedback loop adding new evaluations and new results to determine which terms are relevant. The feedback loop would have expected advantages, such as, speeding up processing time, improving customer satisfaction and increasing the quality of the keywords in the topic label 719 to improve its discoverability to customers. Having an existing keyword mapping to a label and a synonym of the existing keyword used in a similar utterance would be an example where a high confidence action 732 would be taken.

The method of identifying representative topic words to labels may be implemented in a computer system 112 including I/O interface(s) 112 that capture user interfaces.

Figure 8:
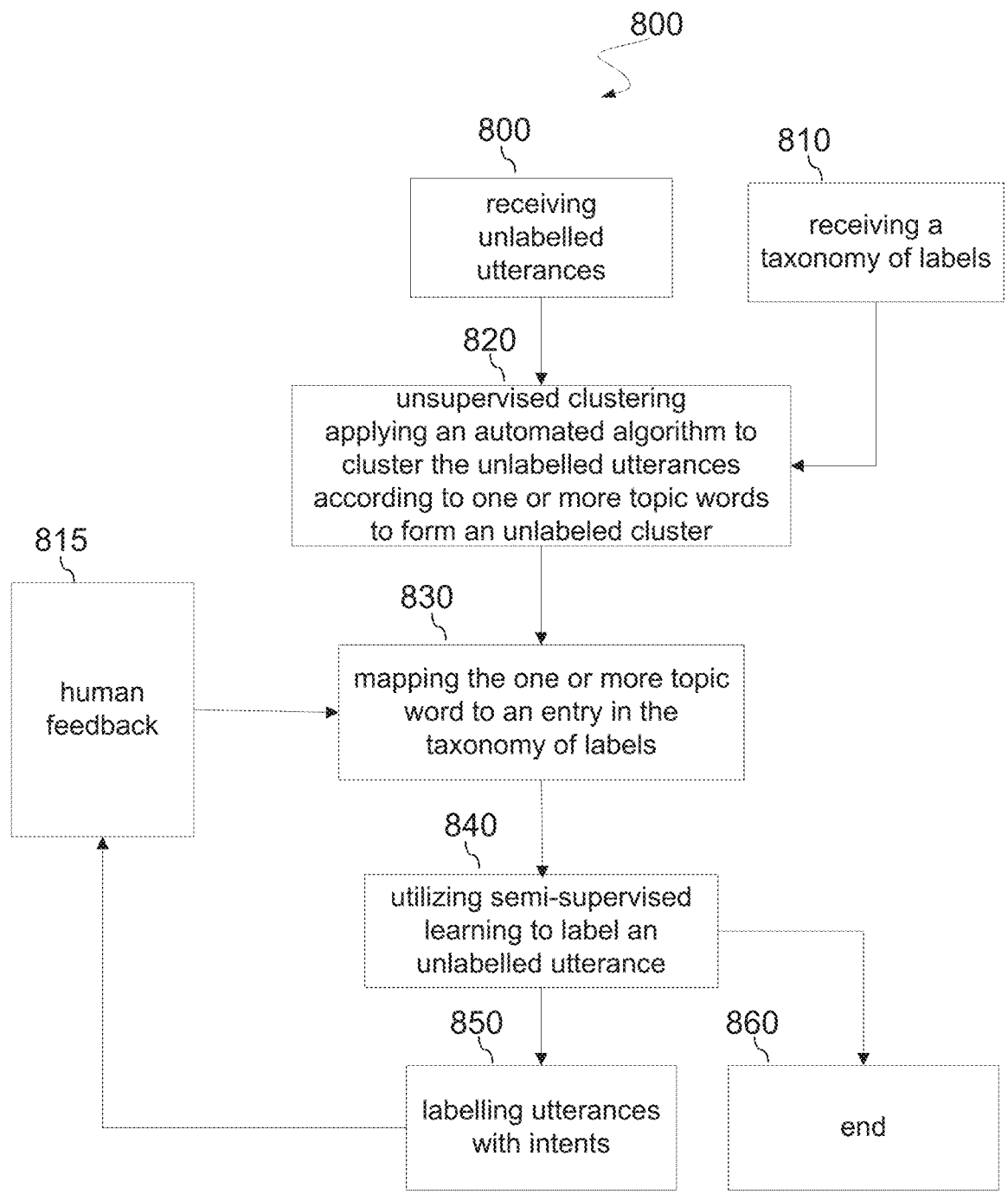
FIG. 8 depicts an example embodiment including details from FIG. 7.

FIG. 8 depicts a more detailed flow of an example embodiment depicting an aspect of the invention described herein. The process begins at step 800 where unlabeled utterances 800 are received. This could be from where a customer 715 has contacted customer contact 720 with a request for support. The customer contact 720 could be via any communication technique. In the example embodiment of FIG. 7, the user utilizes browser 717 to contact customer contact 720. The communication between customer contact 720 and the customer 715 could be, for example and without limitation, one or more of the following: verbal, text, text selections, short message service (SMS), instant message, interactive voice response, numeric keyboard, browser 717 GUI elements, forums, social media, texting, smart phone application, and the like. The customer contact 720 may even be a voice response system service that itself uses artificial intelligence (AI) to communicate with customer 715. The process proceeds to perform unsupervised clustering 820, where an automated algorithm is applied to cluster the unlabeled utterances according to one or more topic words to form an unlabeled cluster. Also at step 820, a taxonomy of labels 810 is received. The algorithm utilizes a statistical analysis to form clusters for the unlabeled utterances based on a similarity of the terms found in the taxonomy of labels 810. In an embodiment, unsupervised clustering is used to form the clusters using techniques, such as, a topic modeling method, a Latent Dirichlet allocation (LDA), a variational bayesian, or a statistical probability. The taxonomy of labels 810 may be supplied by human annotators or be received from a content repository 754 based on virtually any source. Additional sequential methods such as hidden markov models (HMMs) can also be applied to consider the sequential order of topics in a conversation and update the clustering results. The process proceeds to step 830 where the one or more topic words is mapped to an entry in the taxonomy of labels using semantic analysis.

At step 830, the mapping may be based on matching topic words to entries in the taxonomy of labels. Alternatively, the mapping may be based on matching between the taxonomy of labels and unlabeled utterances. The input includes both the label taxonomy and the outputs of unsupervised learning. A semantic matching engine may be used to compute the similarity between topics word in utterances and labels in the taxonomy. Topic word level matching may be computed using, for example, the word2vec similarity between a topic word and a predefined label. If the similarity value is above a certain threshold, the label will be assigned to the topic word. A label can be associated with multiple topic words. The process then proceeds to step 840 where semi-supervised learning is used to label an unlabeled utterance.

With the invention disclosed herein, once topic words are labeled, there is no need to analyze utterances for further annotation. That is, the mapping of the terms to labels allows utterances with the terms to be directly labeled. That is, once a term is used to label an utterance, the process may proceed to step 860 to end. A semi-supervised algorithm may be used. This step preforms clustering on utterances with constraints generated from sematic matching 830. In this step, the constraints are integrated from both topic-word level and utterance level, and then semi-supervised clustering may be performed according to the constraints. For example, a customized seeded LDA can be designed to take both labeled topic words and utterances used as seeds for clustering. After the updated clustering results are obtained from semi-supervised clustering 840, human annotation and semantic matching 830 can be further applied to generate additional seeds (constraints) and perform semi-supervised clustering 840. Also, annotators may be asked to annotate whether a topic word is relevant for a given label. As a result, a list of topic words are identified as associated with the label. These topic words will be used as seeded words (e.g. additional clustering constraints) in semi-supervised clustering 840. Moreover, once a topic word is labeled, corresponding utterances can be directly labeled. In some embodiments, the corresponding utterances may be extracted for further annotation. A similar procedure can be applied to utterance level matching. For example, annotators can directly assign labels to representative utterances based on key words found in the utterance. The process proceeds to labeling utterances with intents 850. The terms in an utterance are associated semantically with a taxonomy of labels 810 and the terms associated with the cluster utilizes the taxonomy to identify a label for the terms. Also, at step 850 a representative utterance may be chosen to represent the label. Once the unlabeled utterance is labeled at step 840, the process may proceed to end 860.

In an embodiment, the process proceeds to step 815 where human feedback 815 is used to validate the mapping. The process can be repeated until annotators reach a certain degree of agreement.

The label is a classification that may indicate, for example, and without limitation, a billing question, directions to perform steps, part replacement information, not supported disclaimer, or any content that helps answer or resolve the question posed by the customer 715. The identification topic label 719 for the utterances may be provided to the customer 715 via any of the communication technologies. It could be, for example, a description of steps to follow to land on the topic label 719 by utilizing the browser 717. The repository 750 may be a database management system (DBMS) supporting indexing, queries, and other typical database features. It could be any data store for recording and retrieving data. The repository 750 may include various elements, for example, but not limited to, historical activity 752 that records a history of interactions by different users by various methods, a content repository 754, that identifies, for example, product features and associates the product features with web pages, user browser activity when reaching web pages, and admin rules 756 that may determine policies for capturing information, rules for changing web pages, and the like. The repository 750 may have default rules for tracking of topic words and associating topic words with web pages. The repository 750 may be adaptive and may automatically adjust based on feedback via artificial intelligence (AI) technology. Although the user interface depicted in FIG. 7 is browser 717, any user interface may be used. The user interface may provide a GUI where the user inputs parameters as menu entries, command line entries, scripts entries, configuration files, .xml files, or any other means of providing the required information.

In some embodiments, the system may derive the required information from a history of accesses kept by the browser 717. The browser 717 or the search engine used by the customer 216 may provide Application Programming Interfaces (APIs) such as a representational state transfer (REST) to support retrieving the browser 717 search history. As the system may keep track of information extracted from the search history to identify at least one topic word 710 and determine an initial confidence associated with the identified at least one topic word 710 based on patterns of access and queries. During step 710, the processing engine 725 uses confidence algorithm 730 to access the repository 750 and to characterize the at least one topic word 710. The characterization identifies at least one topic word 710 to form an at least one topic label 719 characterization. During step 712, the processing engine 725 uses confidence algorithm 730 to access the repository 750 and to characterize make the tone determination 712. The characterization utilized the at least one topic word 710 used to form the at least one topic label 719 characterization.

The human feedback 815 may be tied to the confidence algorithm 730 that formulates queries against the repository 750 to determine how the at least one topic word 710 have been used by others. The historical activity 752 may be retrieved as well as the information from the content repository 754 to find associations between the usages and products. Natural language processing (NLP) may be applied to the historical activity 752, to the at least one topic word 710, and the content repository 754 to categorize each of the at least one topic word 710 and associate them with the topic label 719 and the tone determination 712. Deep analytic analysis and artificial intelligence technologies may be used to adjust the categorization. Feedback from Subject Matter Experts (SMEs), product representatives, and other user feedback may be used to tune the characterization and form a confidence level or ranking that the at least one topic word 710 affect the labeling of the topic label 719. In most cases, adding any keyword from the at least one topic word 710 to the topic label 719 is unlikely to change the topic label 719. However, adding some terms may have unwanted side effects. For example, some keywords may not relate to the specific product or cause an undesirable association. Some embodiments may have different processes related to the at least one topic word 710 based on different criteria. The actions that follow depend on the confidence level and the admin rules 756.

The illustrative embodiment is based on a predicted improvement of the labeling 719 for utterances based on the confidence algorithm 730. Once the human feedback in step 815 is completed, the process continues to step 830. If the confidence is high that adding at least one topic word 710 a clustering of keywords improves the labeling for the clustered utterances, then the process continues to step 840.

Figure 9:
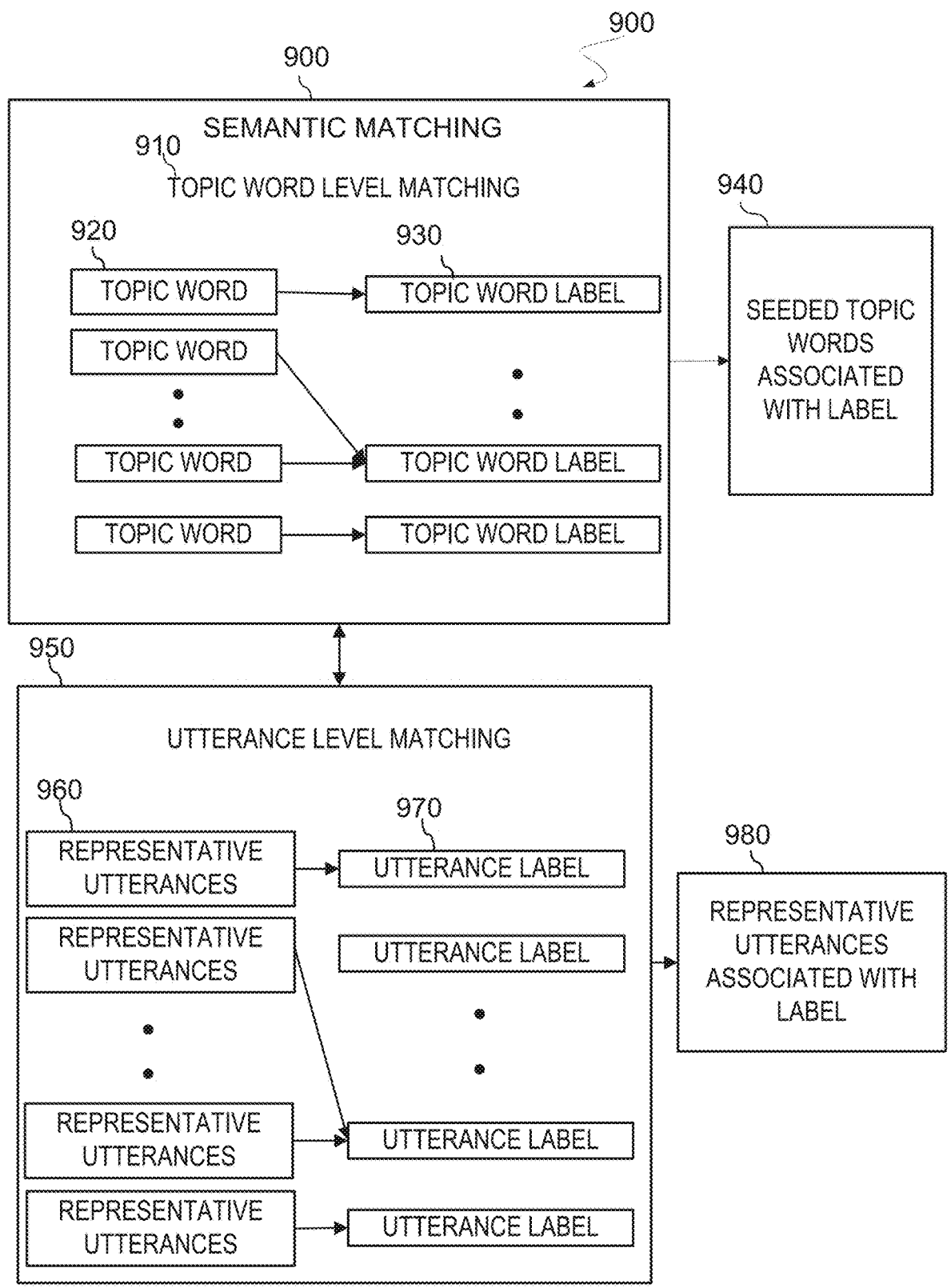
FIG. 9 depicts more details for the example embodiment from FIG. 7.

FIG. 9 depicts more details of semantic matching 830 used in an example of steps performed in FIG. 7. In an example embodiment, sematic matching 900 is done at two separate levels. Topic word level matching 910 takes sets of topic words W (W1, W2, . . . , Wn) 920 and utilizes semantic analysis to associated topic words from the utterances and word(s) 718 with a topic label 719. For each set of topic words Wk (Wk, Wk+1, . . . , Wk+m) 920 there is associated a topic word label WLk 930. These are seeded topic words associated with labels 940. Utterance level matching 950 takes a set of representative utterances U (U1, U2, . . . , Up) 960 and applies an algorithm to assign an utterance label 970. For each set of utterance labels ULk 970 there is associated an utterance label ULk (ULk, ULk+1, . . . , ULk+n) used to select representative utterances 980. In an example embodiment, the word2vec similarity between a topic word and the intent label is used to assign mappings.

FIG. 10 depicts some examples of mapping shown in FIG. 9. Examples of mapping between dialog acts and keywords are shown as entries in table 1010. Examples of mappings between dialog acts and representative keyword sentences are shown in table 1020.

Emotion analysis of online customer service conservation is important for good user experience and customer satisfaction. However, conventional metrics do not fit this application scenario. A case study was used for analyzing customer satisfaction. The case study collected and labeled online conversations of customer service against an on-line social media. For the case study, 8 new metrics named as tones are defined, to describe emotional information. To better interpret each tone, the Latent Dirichlet Allocation (LDA) model is extended to Tone LDA (T-LDA). In T-LDA, each latent topic is explicitly associated with one of three semantic categories, i.e., tone-related, domain-specific and auxiliary. By integrating tone label into learning, T-LDA can interfere the original unsupervised training process and thus is able to identify representative tone-related words. In evaluation, T-LDA shows better performance than baselines in predicting tone intensity.

Due to the popularity of social web, many companies' set-up online agents to provide customer service. Unlike conventional telephone call, customers and agents interact asynchronously via the web, e.g., publish tweets and '@' the particular account.

While there is more convenience, customers tend to be quite emotional via online help desk. Besides providing correct solution for the problem, it is equally important for online customer agents to properly pacify such emotion. The objective of the study includes: i) understanding the user behavior in context of online customer service, ii) providing training materials for online customer service agents, and iii) shedding insight in the development of human-like auto-response bot.

To understand each tone with labeled data, there are two main issues. The first one is how to handle disagreement labels. In the labelling process, to mitigate bias, each tweet is labeled by multiple people and the average is used as the true label. However, variance also needs to be considered. For instance, two tweets with the same average intensity label should be treated different if they have different variance. An adjustment strategy for the label considering factors such as average, variance and number of people who label it.

The second issue is how to model the label data to help understand the tone. Particularly, given one tone, what are its representative words? One natural way is to model it as a regression task with the labeled tone intensity. However, training on the raw bag-of-word feature may be quite noisy since not all words are tone-related. Another method is to use latent topic modeling, e.g., Latent Dirichlet Allocation (LDA). But it is an unsupervised method and the learned latent topic may not be associated with tone. The Tone LDA (T-LDA) model was developed as an essentially generative model and follows a similar generative process with LDA. However, each latent topic has an explicit semantic meaning, falling into one of three categories: tone-related, domain-specific, and auxiliary. The first category aims to capture words that are highly associated with tone. The second one is to find words that are exclusive to a specific domain. Particularly in this disclosure, each domain corresponds to a company. Finally, the auxiliary topic contains meaningless words. Note that it is not equivalent to conventional "stop words." It also includes those that have a high frequency of appearance but is not related to either tone or domain. For example, the word "account" may appear in many areas such as bank, mobile carrier, online shopping, etc., and thus it becomes a common "meaningless" words that are representative of none. A design is disclosed to be especially helpful in filtering out tone-irrelevant words.

In LDA, a prior Dirichlet distribution determines the latent topic vector. In T-LDA, however, this Dirichlet itself are model parameters that need to be learned. Specifically, the tone-related ones are fully known after human labeling the tone intensity. For domain-specific ones, only which domain (company) the document (tweet) belongs to is known, but not the intensity, thus they are half-known. Finally, the auxiliary is fully unknown. By fixing the tone-related Dirichlet parameters to be the known tone labels, the original unsupervised learning is interred and allows for the model converge to handle the desired support.

The actual case study used tone analysis over multiple companies by the following: (1) Defining new 8-dimension metric tone to describe emotional factors in scenario of online customer service. (2) Developing a new topic model Tone LDA (T-LDA) to learn the representative words for each tone. (3) Conducting a case-study on the tone analysis over multiple companies' online customer service (via social media).

For a bottom-up analysis, there are in general three steps: data crawling, metric identification, and tone labeling. The first step is to crawl through raw tweet data, The second step is to identify proper metrics. The final step is to label data with the defined tone. To study tones involved in the customer service domain, 62 brands with dedicated customer service accounts were chosen on social media, which cover a large variety of industries, geographical locations and organization scales. Social media conversational data was used to capture both the brands' tweets and tweets mentioning each of the brands. A Streaming-API was used to reconstructed conversations based on the "in_reply_to_status_id" and "in_reply_to_user_id" elements of the responses. Over 2.6M user requests were collected. Conversations were collected over a two month period between Jun. 1 and Aug. 1, 2016. Only those conversations receiving at least one reply and involving only one customer and one agent were used. In addition, all non-English conversations or conversations containing requests or answers with images were are also removed from the dataset. After data cleaning, there were 14,118 conversations/71,171 conversational tweets with 31 brands. For tone identification, a set of 53 emotional metrics (including aggressive, sincere, apologetic, relieved, sad, etc.) were preselected drawing from a number of literatures across different domains, such as marketing, linguistic, and psychology. 500 conversations (about 2500 tweets) from the collected dataset were chosen and crowd workers were asked to rate the extent to which these 53 metrics can best describe the selected conversations. To be more specific, workers were required to annotate on a conversation level, labeling all tweets involved in a conversation. To preserve privacy, all the @mentions that appeared in each conversation were replaced with as @customer, @[industry]_company (e.g. @ecommerce_company, @telecommunication_company), @competitor_company, and @other_users. For labeling, workers were asked to indicate on a 4-point Likert scale, ranging from "Very strongly" to "Not at all." Advantages of using Likert scale over binary yes/no include: higher tolerance for diverse perceptions and less sparsity for generated labels. Each conversation was labeled by 5 different crowd workers. Workers were restricted to being U.S. residence as well as maintaining some moderate level of accuracy in their previous annotation tasks. Validation questions were embedded in the real tasks to validate the quality of collected labels. The collected ratings were reliably aggregated via a reference-based method.

A factor analysis on the labeled data was performed using principal components analysis (PCA). The PCA of the 53 attributes (metrics) revealed a highly interpretable eight-dimensional solution, whose eigenvalues are greater than one. By analyzing the contribution of 53 attributes in each component, the eight emotional factors were identified as: anxious, excited, frustrated, impolite, polite, sad, satisfied, and sympathetic. With the eight identified tones, crowd workers were asked again to annotate the extent to which each of the tone is demonstrated in a tweet on the 71,171 collected tweets. The process is the same with the one annotating original 53 metrics, as described earlier. In the end, there are 23,785 with non-zero anxious, 30,715 excited, 20,717 frustrated, 9,251 impolite, 63,434 polite, 30,439 sad, 22,758 satisfied, and 31,289 sympathetic. To facilitate modeling, usually the raw textual file is converted to a bag-of-word feature vector. The Standford NLP Parser was used to do the word segmentation and part-of-speech tags. Additionally, a few heuristic rules were applied to reserve particular word types in Tweet such as name, hash tag, number sequence, emotion icon, and word of negation. In an example on-line social media, user name has prefix of "@" and hash tag of "#." In preprocessing, the name was used to identify different customer support accounts, which then become the identifier of domain-specific topic for the Auxiliary Tone Model. The hash tag is removed because it is a typical characteristic of an example on-line social media and may bias the model. In customer support's response, a telephone number is sometimes provided for the user. This information is a strong Domain-specific signal. Such number sequence is sometimes segmented by the parser. To avoid this case, a heuristic pattern was matched to extract possible phone numbers in the whole sentence before segmentation. The list of patterns is: a. [1.]xxxxxxxxxx b. [1-](xxx)[-]xxx-xxxx c. [1-]xxx-xxx-xxxx and d. [1-]xxx xxx xxxx where the x represents any number digits from 0 to 9, and content in square parenthesis stands for "optional" when matching patterns. Sometimes negative words are used to represent opposite meaning. For example, " . . . is not helpful", " . . . hasn't yet arrived." Using bag-of-word feature after segmentation, such information is lost. Therefore, the parser's Part of Speech (POS) tag was used to detect negation, then the next noun/adjective/verb is converted to a negative format, e.g., "neg_helpful", "neg_arrived." Such negative format is treated as a unique word in the feature space.

In the on-line social media, some users would like to use emotion icons when publishing tweet. They are short and concise but contains many emotional information. For example, ":)" represents smile, ":(" means sad, "T_T" represents crying. Each icon was correlated with tone and thus treated as a unique word. As the current parser does not support identifying emotion icons, each tweet was preprocessed via string match based on a lexicon to label these emotion icons. In some cases, multiple punctuation, especially question mark (?) and exclamation mark (!) are used together. For example, "it's awesome!!!", "Things that used to be $129 are now $128!!!! ??????", etc. Such repeated punctuation was assigned a different meaning from the single one. These are transformed to "!_rep" and "?_rep" and treated as two unique words.

One issue when processing human-labeled data is how much should these labels be trusted. This issue is worth more attention especially when one item is labeled by multiple people and the results are quite different. For discrete choice of strength, e.g., ratings, one common method is to calculate the mean value and use it as a ground-truth label. One weakness of this method is that it fails to consider divergence. Consider such two scenarios: i) two people label the item as degree of 2 and ii) one person label it as degree of 1 and another labels it as a degree of 3. The mean value in both cases are the same. However, the divergence is different. Apparently the first one receives more agreement and should be more reliable. A statistic method is applied to adjust the labels. Intuitively, the true label of an item is the average value among all people. It is impossible to obtain such value since it is unrealistic to ask all people to label an item. Instead, a few people are randomly sampled to do the task, and the goal is to infer the real one from sampled values. Also, an assumption is made that by default the tone label of an item is neutral (degree of 0) unless there is a strong evidence otherwise. That means a mechanism is needed to decay the sample average. This assumption complies with the goal of finding representative words for each tone. If there is big divergence, it suggests ambiguity and thus is not representative.

Formally, let s denote the number of people labeling the item and $\mu$, $\hat{\sigma}^2$ the average and variance of the labels respectively. The sample average $\hat{\mu}$ is decayed by the probability that it is no smaller than 0. Using the central limit theorem, the sample average satisfies a Gaussian distribution, i.e., $\hat{\mu} \sim N(\mu, \sigma^2/s)$, where $\mu$, $\sigma^2$ are the average and variance over the whole population. The adjustment can be written by the equation:

$$\tilde{\mu} = \hat{\mu} \cdot P(\tilde{\mu} \leq 0 | \mu, \sigma^2, s) = \qquad (1)$$

$$\hat{\mu} \int_v^{+\infty} \frac{\sqrt{s}}{\sqrt{2\pi}\,\sigma} e^{-\frac{s(x-\mu)^2}{2\sigma^2}} dx \approx \hat{\mu} \int_0^{+\infty} \frac{\sqrt{s}}{\sqrt{2\pi}\,\hat{\sigma}} e^{-\frac{s(x-\hat{\mu})^2}{2\hat{\sigma}^2}} dx =$$

$$\hat{\mu}\left(1 - \Phi\left(-\frac{\hat{\mu}}{\hat{\sigma}}\sqrt{s}\right)\right)$$

where the $\Phi(\cdot)$ represents the cumulative density function for standard Gaussian distribution (mean 0, variance 1). As can be seen from equation (1), the discount $$1 - \Phi\left(-\frac{\hat{\mu}}{\hat{\sigma}}\sqrt{s}\right)$$

ranges from 0 to 1 and involves three factors: sample mean $\hat{\mu}$, variance $\sigma^2$ and size s. Generally, small sample mean has small discount. This design assumes the neutral tone (label 0) unless there is strong evidence otherwise. Similarly, small sample size leads to small ratio, indicating a reliability proportional to the number of people labeling the item. Finally, the variance is negatively correlated with discount, where small value results in decay ratio close to 1 and vice versa. Particularly, if the variance is 0 (all people choose the same label), there is no decay for the sample mean. Generally, the latent topic modeling has a discrete space of latent topic and each latent topic is represented by a distribution over word space. In T-LDA, there are in total three types of topics by design, and not all of them are latent. The first one is tone-related topic, which is known because of human labeling. The second one is domain-specific topic, aiming to capture the frequent words for different domains. Finally, there is one auxiliary topic, related to words that support a grammar-correct sentence. The graphic representation of T-LDA is shown in 330. As can be seen, the tone-related topic density $\alpha_T$ and the word W are the only known variables. Particularly, the domain-specific topic density $\alpha_D$ is half-white, suggesting that it is partially known. Since for each document, it is known which domain it belongs to, but the density is unknown and needs to be learned from data. In other words, it is known whether the $\alpha_D$ is zero or not but unknown if the specific value is non-zero. Algorithm 1 describes the generative process. First, a prior Dirichlet parameter β generates a word-distribution vectors φ for each topic. Also, each document has its topic density, which generates a topic-distribution vector θ with a Dirichlet distribution. Then for each word a latent variable z is generated according to θ. It indicates which topic is used to generate the next word. Finally, the chosen topic generates a word w based on the corresponding word-distribution vector.

Algorithm 1
T-LDA Generative Process

1: for Each topic do
2:    choose $\varphi_k \sim Dir([\underbrace{\beta \ldots \beta}_{W}])$    * Dirichlet distribution
3: end for
4: for Each document do
5:    choose $\theta_i \sim Dir(\langle \alpha_T^i, \alpha_D^i, \alpha_A^i \rangle)$
6:    for Each word in the document do
7:      choose $z_{ij} \sim$ Multinomial($\theta_i$)
8:      choose $w \sim Dir(\varphi_{z_{ij}})$
9:    end for
10: end for The model is learned by maximizing the posterior log-likelihood. Formally, let D and $\alpha_T$ denote the corpus and corresponding tone labels, and $\Theta=(\varphi, \alpha_D, \alpha_A)$ the collection of model parameters, in the following list of symbols.

| Symbol | Dimension | Description |
| --- | --- | --- |
| M | 1 | Number of documents |
| N | 1 | Number of words in a document |
| W | 1 | Total number of words in the whole data set |
| T, D, A | Set | Set of Tone-related, Domain-specific and Auxiliary topics |
| K = \|T\| + \|D\| + \|A\| | 1 | Total number of topics |
| i, j, k | 1 | Index for document, word and topic |
| $\alpha_T^i, \alpha_D^i, \alpha_A^i$ | vector of \|T\|, \|D\|, \|A\| | Topic density of Tone-related, Domain-specific and Auxiliary topics for $i^{th}$ document |
| β | 1 | Prior Dirichlet distribution parameter for topic-word vector |
| $\varphi_k$ | Vector of W | Word distribution for $k^{th}$ topic |
| $\theta_i$ | Vector of K | Topic distribution vector for $i^{th}$ document |
| $z_{ij}$ | 1 | Topic index for $j^{th}$ word in $i^{th}$ document |

The posterior log-likelihood can be written as below:

$$\log P(\Theta|D,\alpha_T,\beta) = \log P(D|\Theta,\alpha_T) + \log P(\Theta|\alpha_T,\beta) - \log P(D|\alpha_T)$$

$$\propto \log P(D|\Theta,\alpha_T) + \log P(\Theta|\alpha_T,\beta) = \log P(w_{ij}, z_{ij}|\Theta,\alpha_T) + \log P(\varphi|\beta)$$

$$= \sum_{i,j} \log \int P(w_{ij}, z_{ij}, \theta_i|\Theta, \alpha_T) d\theta_i + \sum_k \log P(\varphi_k|\beta) \quad (2)$$

$$= \sum_{i,j} \log \left( \int P(w_{ij}, z_{ij}|\theta_i, \varphi) \cdot P(\theta_i|\alpha_T^i, \alpha_D^i, \alpha_A^i) \right) d\theta_i +$$

$$\sum_k \log P(\varphi_k|\beta)$$

where the data probability P(D) is skipped as it is a constant value free of unknown parameters. The topic-word distribution $\varphi_k$ is determined by a prior Dirichlet distribution, thus the probability $P(\varphi_k|\beta)$ is shown below:

$$\log P(\varphi_k|\beta) \propto \log\left(\prod_w (\varphi_k(w))^{\beta-1}\right) = (\beta-1) \sum_w \log \varphi_k(w) \quad (3)$$

Again the parameter-free constant is skipped. Note that by design each single word $w_{ij}$ is generated by only one topic. A binary variable $\eta_k \in \{1, 0\}$ is introduced indicating whether the word $w_{ij}$ is generated by $k^{th}$ topic. In this case, the integral in equation (2) can be rewritten as below:

$$\int P(w_{ij}, z_{ij}|\theta_i, \varphi) \cdot P(\theta_i | \alpha_T^i, \alpha_D^i, \alpha_A^i)) d\theta_i = \quad (4)$$

$$\prod_k \left( \int P(w_{ij}, z_{ij} = k|\theta_i, \varphi) \cdot P(\theta_i|\alpha_T^i, \alpha_D^i, \alpha_A^i) d\theta_i \right)^{\eta_{i,j}^k} =$$

$$\prod_k \left( P(w_{ij}|\varphi_k) \int P(z_{ij} = k|\theta_i) \cdot P(\theta_i|\alpha_T^i, \alpha_D^i, \alpha_A^i) d\theta_i \right)^{\eta_{i,j}^k} =$$

$$\prod_k \left( \varphi_k(w_{ij}) \int \theta_i(k) P(\theta_i|\alpha_T^i, \alpha_D^i, \alpha_A^i) d\theta_i \right)^{\eta_{i,j}^k}$$

The integral calculates the expected value of $k^{th}$ element in vector θi, which is a random variable satisfying the Dirichlet distribution. Based on the probability density function, the expected value is computed as below:

$$E(\theta_i(k))_{\theta_i \sim Dir(\langle \alpha_T^i, \alpha_D^i, \alpha_A^i \rangle)} = \int \theta_i(k) P(\theta_i|\alpha_T^i, \alpha_D^i, \alpha_A^i) d\theta_i = \quad (5)$$

$$\frac{1_{k \in \alpha_T^i} \alpha_T^i(k) + 1_{k \in \alpha_D^i} \alpha_D^i(k) + 1_{k \in \alpha_A^i} \alpha_A^i(k)}{\sum \alpha_T^i + \sum \alpha_D^i + \sum \alpha_A^i}$$

where $1_{k \in \alpha_D^i}$ is an indicator suggesting whether the k topic belongs to the particular topic category, i.e., Tone-related (T), Domain-specific (D) or Auxiliary (A). By connecting all of these pieces, the objective function L(Θ) is defined as below by connecting all of these pieces with the objective function L(Θ) defined below:

$$\mathcal{L}(\Theta) = \sum_{i,j} \log\left( \int P(w_{ij}, z_{ij}|\theta_i, \varphi) \cdot P(\theta_i|\alpha_T^i, \alpha_D^i, \alpha_A^i) \right) d\theta_i + \quad (6)$$

$$(\beta - 1) \sum_w \log \varphi_k(w) =$$

-continued $$\sum_{i,j,k} \eta_{i,j}^k \left( \log \varphi_k(w_{ij}) + \log \sum_{\tau \in \{D,A\}} 1_{k \in \alpha_\tau^i} \alpha_\tau^i(k) - \log \sum_{\tau \in \{T,D,A\}} \alpha_\tau^i \right) +$$

$$(\beta - 1) \sum_{k,w} \log \varphi_k(w)$$

The model parameters are learned via maximizing the log-likelihood, $\varphi k(w)=1$. However, it is impossible to get the explicit solution due to the existence of unknown variable $\eta^k$. The Expectation-Maximization (EM) of $\eta^k$ is computed with current iteration as below:

$$E(\eta_{i,j}^k)_{\Theta^{(t)}} = 1 \cdot P(\eta_{i,j}^k = 1|\Theta^{(t)}, \mathcal{D}) + 0 \cdot P(\eta_{i,j}^k = 0|\Theta^{(t)}, \mathcal{D}) = \quad (7)$$

$$P(z_{ij} = k|\Theta^{(t)}, w_{ij}) = \frac{P(w_{ij}|z_{ij} = k, \varphi_k^{(t)})P(z_{ij} = k|\alpha_*^{i(t)})}{\sum_{k'} P(w_{ij}|z_{ij} = k', \varphi_{k'}^{(t)})P(z_{ij} = k'|\alpha_*^{i(t)})} =$$

$$\frac{\varphi_k^{(t)}(w_{ij}) \sum_{\tau \in \{T,D,A\}} 1_{k \in \tau} \alpha_\tau^{i(t)}}{\sum_{k'} \varphi_{k'}^{(t)}(w_{ij}) \sum_{\tau \in \{T,D,A\}} 1_{k' \in \tau} \alpha_\tau^{i(t)}}$$

where $\alpha_*^{i(t)}$ represents all topic density (i.e., T, D, A) for ith document at the kth iteration. With calculated $E(\eta_{ij}^k)_{\Theta(t)}$, the parameter at the next iteration is updated by maximizing the objective function, i.e., $\Theta(t+1)=\mathrm{argmax}_\Theta L(\Theta|E(\eta_{ij}^k)_{\Theta(t)})$, with constraint $\forall k, \Sigma_w \phi^{(t+1)}(w)=1$.
Specifically, the updated rule for each parameter is given below:

$$\forall k, w \quad (8)$$

$$\varphi_k^{(t+1)}(w) = \frac{\beta - 1 + \sum_{i,j} 1_{w_{i,j}=w} E(\eta_{i,j}^k)_{\Theta^{(t)}}}{\sum_{w'} \left( \beta - 1 + \sum_{i,j} 1_{w_{i,j}=w'} E(\eta_{i,j}^k)_{\Theta^{(t)}} \right)}$$

$$\forall i, \tau \in \{D, A\}, k \in \tau \quad (9)$$

$$\alpha_\tau^{(t+1)}(k) = \begin{cases} \left( \sum \alpha_T^j \right) \cdot \frac{E(\eta_{i,j}^k)_{\Theta^{(t)}}}{\sum_{k' \in \alpha_T^j} E(\eta_{i,j}^{k'})_{\Theta^{(t)}}} & \text{if } \sum \alpha_T^j \neq 0 \\ \max\{\alpha_T^j | \forall i\} \cdot \frac{E(\eta_{i,j}^k)_{\Theta^{(t)}}}{\max_{k' \notin \alpha_T^j} E(\eta_{i,j}^{k'})_{\Theta^{(t)}}} & \text{otherwise} \end{cases}$$

As can be seen in equation (9), there are special update rules when tone labels are all zero. These rules are necessary to guarantee a unique solution. Recall in Algorithm 1, the generative process from $\alpha$ to $\theta$ satisfies Dirichlet distribution, where the probability density function is only affected by the relative scale of parameters. In other words, the topic density parameters are unbounded. In training phase, the $\alpha_D$, $\alpha_A$ are bounded by the known tone labels $\alpha_T$. But if the tone labels are all zero, there will be infinite solutions for domain-specific and auxiliary topic density. To avoid this situation, any arbitrary positive value can be used as "anchor". The maximum value of the tone topic density is chosen so that density of other topics fall within the same scale.

With learned T-LDA, there are a number of applications in representing tones. One is to provide representative words for each tone. One goal of T-LDA is to help people understand different tones via representative words. With T-LDA, these words are obtained in two steps, i) calculate posterior probability and ii) adjust by auxiliary topic. With no loss of generality, given a particular word w, the computed posterior probability for a topic $z \in \{T, D, A\}$ is shown in equation (10):

$$P(z|w) = \frac{P(z, w)}{P(w)} = \frac{P(w|z)P(t)}{\sum_{z'} P(w|z')P(z')} = \frac{\varphi_z(w)}{\sum_{z'} \varphi_{z'}(w)} \quad (10)$$

Note that in equation 10, a uniform probability is assumed for selecting a topic, i.e., P $(z_i) \equiv$ P $(z_j)$. After step i the normalized posterior probability for each topic is obtained. To obtain the representative words, the posterior probability is subtracted by the auxiliary topic, i.e., $(z|w) - \Sigma_{z' \in A} P(z'|w)$. This adjustment is to remove words that are representative in both target topic and auxiliary topic. Recall that by model design and learning auxiliary topic is for meaningless words. To find representative words for meaningful topic (either tone or domain), the noisy words in auxiliary topic need to be removed. In order to identify example sentences for each tone, each sentence can be treated as a bag-of-word set. With calculated posterior probability for each word the ranking of the sentence is the sum of these probabilities, i.e., $\Sigma_w P(z|w)$. An auxiliary probability is not used for adjustment as a practical matter, the impact of the auxiliary topic is reduced due to the consideration of multiple words. Like all latent-topic models, one of the application is to infer a document's topic distribution vector, i.e., $\theta$, given its bag-of-word feature. Naturally, given a document D, the corresponding topic distribution $\theta^D$ is obtained by maximizing the posterior likelihood, as shown in the equation below:

$$\theta^D = \arg\max_\theta P(\theta|D) = \arg\max_\theta \frac{\prod_{w \in D} \sum_z P(w|z) P(z|\theta)}{\prod_{w \in D} P(w)} \quad (11)$$

Since, this is time-consuming, a trade-off is to calculate each latent topic and word independently and then normalize them. Formally, let $\theta^D(k)$ denote the $k^{th}$ element of the topic distribution vector, its value is calculated below:

$$\theta^D(k) = \frac{\sum_{w \in D} P(z = k|w)}{\sum_{w \in D} \sum_{z'} P(z'|w)} \quad (12)$$

Two aspects of the Tone LDA (T-LDA) model are regression task and representation task. The former one checks its performance on predicting tone density. The latter one is a case study and analyzes its output of representative words and sentences for each tone. For regression, T-LDA is used to predict the topic distribution vector $\theta$, then a separate regression model is used to predict the real tone density label. That means, the T-LDA is treated as a feature extraction in this process. Similarly, other topic models, e.g., LDA, may be used as baseline for comparison. Also, instead of using topic models to extract feature, the raw bag-of-word feature can be used to train a regression model directly (denoted as Raw). With no loss of generality, in regression the tone density is normalized to the range of 0-1 and logistic regression is trained. The mean squared error (MSE) is used as the evaluation metric. Formally, let y denote the labeled tone density and $\hat{y}$ is the predicted value. For each tone, the MSE on a test data Y is defined as follows:

$$MSE_y = \frac{1}{|Y|} \sum_{y \in y} (y - \hat{y})^2 \qquad (13)$$

Figure 11:
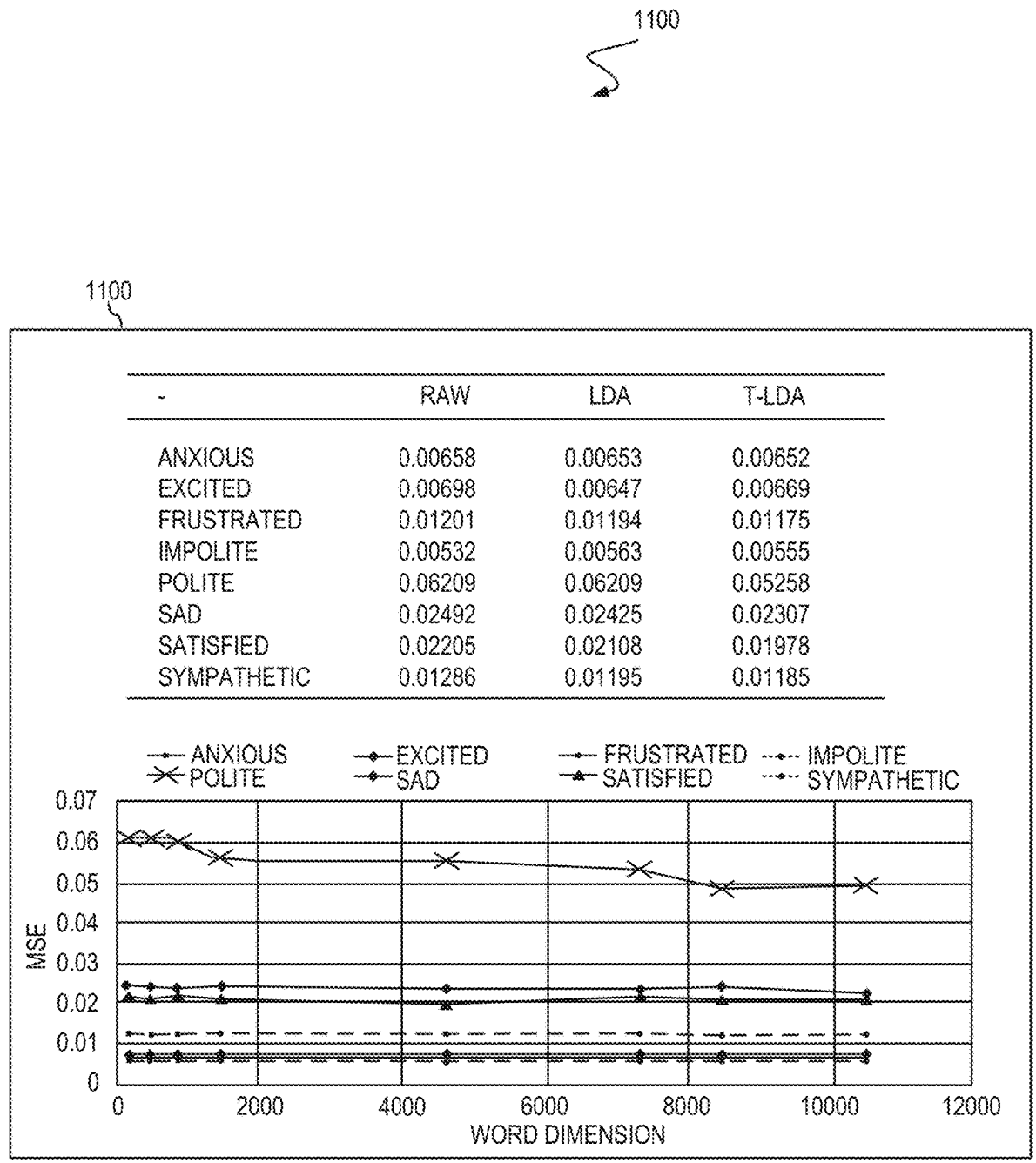
FIG. 11 depicts a mean square error (MSE) of tone regression related to word dimension calculated for a case study.

FIG. 11 shows the average results with 5-fold cross-validation. As can be seen, the T-LDA achieves lowest error for all tones except Excited. The regression model trained on raw bag-of-word has highest error in all. This suggests training on raw word is not as good as extracted features. Also, in topic model training, the LDA does not use tone density information while the T-LDA does. Although in the final regression training, such information is used with word "please", such as "please let us know", "please follow us", and so on. Furthermore, there are words that do not seem to correlate with the particular tone when viewed separately. However, once several words are combined, it highly indicates the tone. For example, in tone anxious, single representative words contain "anyone", "need", "help". There is no obvious correlation between them and anxiety. However, it makes more sense if one sees sentences like "can anyone help me", "I need help".

As a side product of T-LDA, the top words of domain-specific topic can be analyzed, which represents a company. There are in total 31 companies in the data set. FIG. 10 depicts some abstracted representative samples for illustration purposes. These words can be categorized into three following aspects: 1) "Contact information." When customer service replies, often contact information such as telephone, URI, email, etc. is attached, which appears to be response template. 2) "Company-related words." These words are highly associated with the company. Some are related to the company's service, e.g., package, tracking for @companyhelp. 3) "Common Issues." This category reflects common problems complained by customers. For instance, the "neg_arrive", "neg_arrived" for @producthelp represent the ordered package is not received. Also, "neg_service" and "neg_internet" for @internetserviceares means the internet service has issues with internet connection.

In disclosed model, there are three types of topics, i.e., tone-related, domain-specific, and auxiliary. The latter two types are used to capture words that are not tone-correlated but appear in document labeled with tones. Specifically, the domain-specific contain words that have unique signature of that particular domain (company). And the auxiliary topic is to model frequent words that are neither tone-related nor domain-specific. The case study shows how these two types of topic help improve the tone analysis.

In summary, the impact of these two topic types, the domain and auxiliary topic are switched off during training. Then the resulted top words are compared with that of full model. The model with tone topic, is denoted as tone-only. The one without auxiliary, is denoted as tone+domain. Note that tones are skipped where there is no significant difference among models. In general the model with all three topic types has a more sensible set of top words for tones. For other two, however, there are words that are obviously domain-specific or auxiliary. For tone anxious, product words are ranked high in tone-only model but it is actually a product (thus domain-specific). The model without auxiliary ranks "password", "email" and "account" as top words, which are more suitable in auxiliary category. For tone excited, auxiliary words "still", "not" and domain-specific words appear in the list of tone-only model. And the auxiliary word "tomorrow" is ranked high by tone+domain model. Finally for tone sympathetic, the tone-only model may include a domain-specific URL link. In the study, a bottom-up emotion analysis on online conservations of customer service was analyzed. 8 tones are defined as new metric for emotional measurement. LDA was extended to Tone LDA (T-LDA) to model tone intensity and find corresponding descriptive words as well as sentences. By evaluation on the example on-line social media data, the T-LDA demonstrate its better topic at modeling than baselines. The current T-LDA works on single tweet. In reality, a complete conservation consists of multiple tweets between a customer and an agent. Thus tone of consequent tweets may have impact on each tone.

FIG. 12 depicts an example embodiment where a customer communication is via a phone call between the customer and a customer support representative. The process begins by receiving an audio communication between a customer and a customer service representative by an audio conference support 1200. The process proceeds by converting speech to text 1210 as a pre-configured setting provided by the audio conference support. The process continues by storing the text in a repository 1220, such as repository 750. When the phone call ends, the process ends 1230.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for reducing cost and improving real-time performance for analyzing and representing customer care communication progression based on tone assessments, the method implemented by a processor comprising:
    monitoring communications between a plurality of customers and a plurality of representatives to form a plurality of interaction histories;
    analyzing a text form of the plurality of interaction histories according to a Tone Latent Dirichlet Allocation [T-LDA] model to determine a plurality of conversation tones;
    mapping the plurality of conversation tones to at least two conversation phases;
    providing a representation of the conversation tones identifying a first customer tone at a first conversation phase and a second customer tone at a second conversation phase;
    receiving by the T-LDA model a first utterance from the first customer;
    categorizing the first utterance into a semantic category wherein the semantic category is one of a tone-related category, a domain-specific category, and an auxiliary category;
    identifying a topic word in the first utterance associated with the semantic category;
    associating the topic word with a topic word label; and
    identifying a representative utterance associated with the topic word label.

2. The method of claim 1, wherein the plurality of conversation tones is selected from a group consisting of anxious, excited, frustrated, impolite, polite, sad, satisfied, and sympathetic.

3. The method of claim 2, further comprising:
    monitoring a conversation between an agent and a customer; and
    associating the conversation with a product.

4. The method of claim 3, further comprising:
    mapping a first tone assessment of the customer to a start conversation phase of the conversation to form a start conversation tone assessment;
    mapping a second tone assessment of the customer to an end conversation phase of the conversation to form an end conversation tone assessment; and
    utilizing a comparison between the start conversation tone assessment and the end conversation tone assessment to evaluate the agent.

5. The method of claim 4, wherein the start conversation tone assessment is different from the end tone assessment.

6. The method of claim 5, wherein the start conversation tone assessment is not satisfied and the end tone assessment is satisfied and the evaluation of the agent for the conversation is rated excellent.

7. The method of claim 5, wherein the first tone is satisfied and the second tone is not satisfied and the engagement tracking assessment is rated as the customer is not satisfied and the evaluation of the agent for the conversation is rated poor.

8. The method of claim 2, wherein the plurality of customer tones is determined by a statistical confidence algorithm.

9. A computer program product for reducing cost and improving real-time performance for analyzing and representing customer care communication progression based on tone assessments, the computer program product comprising a computer readable storage medium having program instructions embodied therewith, the program instructions executable on a processing circuit to cause the processing circuit to perform the method comprising:
   monitoring communications between a plurality of customers and a plurality of representatives to form a plurality of interaction histories;
   analyzing a text form of the plurality of interaction histories according to a Tone Latent Dirichlet Allocation [T-LDA] model to determine a plurality of conversation tones;
   mapping the plurality of conversation tones to at least two conversation phases;
   providing a representation of the conversation tones identifying a first customer tone at a first conversation phase and a second customer tone at a second conversation phase;
   receiving by the T-LDA model a first utterance from the first customer;
   categorizing the first utterance into a semantic category wherein the semantic category is one of a tone-related category, a domain-specific category, and an auxiliary category;
   identifying a topic word in the first utterance associated with the semantic category;
   associating the topic word with a topic word label; and
   identifying a representative utterance associated with the topic word label.

10. The computer program product of claim 9, wherein the plurality of conversation tones is selected from a group consisting of anxious, excited, frustrated, impolite, polite, sad, satisfied, and sympathetic.

11. The computer program product of claim 10, further comprising:
   monitoring a conversation between an agent and a customer; and
   associating the conversation with a product.

12. The computer program product of claim 11, further comprising:
   mapping a first tone assessment of the customer to a start conversation phase of the conversation to form a start conversation tone assessment;
   mapping a second tone assessment of the customer to an end conversation phase of the conversation to form an end conversation tone assessment; and
   utilizing a comparison between the start conversation tone assessment and the end conversation tone assessment to evaluate the agent.

13. The computer program product of claim 12, wherein the start conversation tone assessment is different from the end tone assessment.

14. The computer program product of claim 9, wherein the plurality of customer tones is determined by a statistical confidence algorithm.

15. An information handling system for reducing cost and improving real-time performance for analyzing and representing customer care communication progression based on tone assessments, the information handling system comprising:
   at least one processor;
   a memory coupled to the at least one processor;
   a set of instructions stored in the memory and executed by the at least one processor wherein the set of instructions perform operations including:
   monitoring communications between a plurality of customers and a plurality of representatives to form a plurality of interaction histories;
   analyzing a text form of the plurality of interaction histories according to a Tone Latent Dirichlet Allocation [T-LDA] model to determine a plurality of conversation tones;
   mapping the plurality of conversation tones to at least two conversation phases;
   providing a representation of the conversation tones identifying a first customer tone at a first conversation phase and a second customer tone at a second conversation phase;
   receiving by the T-LDA model a first utterance from the first customer;
   categorizing the first utterance into a semantic category wherein the semantic category is one of a tone-related category, a domain-specific category, and an auxiliary category;
   identifying a topic word in the first utterance associated with the semantic category;
   associating the topic word with a topic word label; and
   identifying a representative utterance associated with the topic word label.

16. The information handling system of claim 15, wherein the plurality of conversation tones is selected from a group consisting of anxious, excited, frustrated, impolite, polite, sad, satisfied, and sympathetic.

17. The information handling system of claim 16, further comprising:
   monitoring a conversation between an agent and a customer; and
   associating the conversation with a product.

18. The information handling system of claim 17, further comprising:
   mapping a first tone assessment of the customer to a start conversation phase of the conversation to form a start conversation tone assessment;
   mapping a second tone assessment of the customer to an end conversation phase of the conversation to form an end conversation tone assessment; and
   utilizing a comparison between the start conversation tone assessment and the end conversation tone assessment to evaluate the agent.

19. The information handling system of claim 18, wherein the start conversation tone assessment is different from the end tone assessment.

20. The information handling system of claim 19, wherein the plurality of customer tones is determined by a statistical confidence algorithm.

* * * * *